(12) United States Patent
Branton

(10) Patent No.: US 9,367,646 B2
(45) Date of Patent: Jun. 14, 2016

(54) DOCUMENT AND USER METADATA STORAGE

(71) Applicant: AppSense Limited, Warrington (GB)

(72) Inventor: Paul Keith Branton, Rochdale (GB)

(73) Assignee: APPSENSE LIMITED, Warrington (GB)

( * ) Notice: Subject to any disclaimer, the term of this patent is extended or adjusted under 35 U.S.C. 154(b) by 115 days.

(21) Appl. No.: 13/827,504

(22) Filed: Mar. 14, 2013

(65) Prior Publication Data

US 2014/0279893 A1 Sep. 18, 2014

(51) Int. Cl.
*G06F 17/30* (2006.01)

(52) U.S. Cl.
CPC .............................. *G06F 17/30994* (2013.01)

(58) Field of Classification Search
CPC ................ G06F 17/30994; G06F 17/30575; G06F 17/30067
USPC ......................................................... 707/634
See application file for complete search history.

(56) References Cited

U.S. PATENT DOCUMENTS

| | | | |
|---|---|---|---|
| 6,618,728 B1 * | 9/2003 | Rail | |
| 6,711,293 B1 | 3/2004 | Lowe | |
| 6,938,042 B2 * | 8/2005 | Aboulhosn et al. | |
| 7,139,757 B1 | 11/2006 | Apollonsky et al. | |
| 7,685,200 B2 | 3/2010 | Gunawardena et al. | |
| 7,945,653 B2 | 5/2011 | Zuckerberg et al. | |
| 8,341,112 B2 | 12/2012 | Zhang et al. | |
| 8,386,509 B1 | 2/2013 | Scofield et al. | |
| 8,417,681 B1 | 4/2013 | Miloushev et al. | |
| 2002/0073120 A1 * | 6/2002 | Bierbrauer et al. | 707/513 |
| 2002/0178153 A1 | 11/2002 | Nishioka et al. | |
| 2003/0217052 A1 | 11/2003 | Rubenczyk et al. | |
| 2004/0019846 A1 | 1/2004 | Castellani et al. | |
| 2004/0133544 A1 | 7/2004 | Kiessig et al. | |
| 2004/0199494 A1 | 10/2004 | Bhatt | |
| 2005/0066190 A1 | 3/2005 | Martin | |
| 2005/0114288 A1 | 5/2005 | Dettinger et al. | |
| 2005/0216532 A1 * | 9/2005 | Lallier | 707/204 |

(Continued)

FOREIGN PATENT DOCUMENTS

| | | |
|---|---|---|
| EP | 2648395 A1 | 10/2013 |
| WO | 2011022867 A1 | 3/2011 |

OTHER PUBLICATIONS

Choi, Myung Jin, et al., "A Tree-Based Context Model for Object Recognition," IEEE Transactions on Pattern Analysis and Machine Intelligence, Feb. 2012, vol. 34, No. 2, pp. 240-252.

(Continued)

*Primary Examiner* — Cam-Y Truong
(74) *Attorney, Agent, or Firm* — Wilmer Cutler Pickering Hale and Dorr LLP

(57) ABSTRACT

Techniques are disclosed for providing services to a client device via a shared cloud service. In one embodiment, a method is disclosed that includes storing information on a first device relating to a subject, saving the stored information in a serialized format data file to the shared cloud service, the data file having a filename generated as a function of the subject, providing authenticated access to the data file for a second device via the shared cloud service, synchronizing a copy of the data file via the shared cloud service to the second device, the copied data file reflecting a single up-to-date state of the data file in the shared cloud service, and de-serializing the serialized format data file at the second device.

24 Claims, 14 Drawing Sheets

(56) References Cited

U.S. PATENT DOCUMENTS

| | | | |
|---|---|---|---|
| 2005/0234983 A1* | 10/2005 | Plastina et al. | 707/104.1 |
| 2006/0020586 A1 | 1/2006 | Prompt et al. | |
| 2006/0101092 A1* | 5/2006 | Ishida et al. | 707/203 |
| 2006/0149710 A1 | 7/2006 | Koningstein et al. | |
| 2006/0190469 A1* | 8/2006 | Kathuria et al. | 707/101 |
| 2007/0078832 A1 | 4/2007 | Ott et al. | |
| 2007/0106627 A1 | 5/2007 | Srivastava et al. | |
| 2007/0124208 A1 | 5/2007 | Schachter et al. | |
| 2007/0143663 A1 | 6/2007 | Hansen et al. | |
| 2007/0174247 A1 | 7/2007 | Xu et al. | |
| 2007/0214141 A1 | 9/2007 | Sittig et al. | |
| 2007/0271226 A1 | 11/2007 | Zhang et al. | |
| 2008/0065700 A1 | 3/2008 | Lim | |
| 2008/0109212 A1 | 5/2008 | Witbrock et al. | |
| 2008/0120310 A1 | 5/2008 | Khoury | |
| 2008/0126990 A1 | 5/2008 | Kumar et al. | |
| 2008/0134040 A1 | 6/2008 | Pennington et al. | |
| 2008/0147821 A1* | 6/2008 | Dietrich et al. | 709/216 |
| 2008/0228887 A1 | 9/2008 | Robertson et al. | |
| 2009/0049130 A1 | 2/2009 | Plooij et al. | |
| 2009/0132933 A1 | 5/2009 | Faski | |
| 2009/0172783 A1 | 7/2009 | Eberstadt | |
| 2009/0210512 A1 | 8/2009 | Steinhart et al. | |
| 2009/0300139 A1 | 12/2009 | Shoemaker et al. | |
| 2009/0313555 A1 | 12/2009 | Stovicek et al. | |
| 2010/0057772 A1 | 3/2010 | Manolescu et al. | |
| 2010/0082453 A1 | 4/2010 | Speers et al. | |
| 2010/0146015 A1 | 6/2010 | Milic-Frayling et al. | |
| 2010/0262658 A1 | 10/2010 | Mesnage | |
| 2011/0137902 A1 | 6/2011 | Wable et al. | |
| 2011/0173217 A1 | 7/2011 | Kasperski | |
| 2011/0197166 A1 | 8/2011 | Girgensohn et al. | |
| 2011/0295593 A1 | 12/2011 | Raghuveer | |
| 2012/0089678 A1 | 4/2012 | Cort et al. | |
| 2012/0150978 A1 | 6/2012 | Monaco et al. | |
| 2012/0158517 A1 | 6/2012 | Rathod | |
| 2013/0013529 A1 | 1/2013 | Chheda et al. | |
| 2013/0046773 A1 | 2/2013 | Kannan et al. | |
| 2013/0086615 A1* | 4/2013 | Williams et al. | 725/62 |
| 2013/0166550 A1 | 6/2013 | Buchmann et al. | |
| 2013/0198600 A1 | 8/2013 | Lockhart et al. | |
| 2013/0238564 A1 | 9/2013 | Tucker et al. | |
| 2013/0282790 A1* | 10/2013 | Catmull et al. | 709/203 |
| 2013/0290347 A1 | 10/2013 | Saib | |
| 2013/0304731 A1 | 11/2013 | Zheng et al. | |
| 2014/0040238 A1 | 2/2014 | Scott et al. | |

OTHER PUBLICATIONS

Office Action mailed on Oct. 10, 2013 for co-pending U.S. Appl. No. 13/457,136; 10 pages.

Turk, Matthew, et al., "Eigenfaces for Recognition", Massachusetts Institute of Technology 1991, Journal of Cognitive Neuroscience, vol. 3, No. 1, pp. 71-86.

UK Search Report mailed on Oct. 23, 2013 for co-pending UK Application No. GB1307488.5; 3 pages.

Viola, Paul, et al., "Rapid Object Detection Using a Boosted Cascade of Simple Features," Accepted Conference on Computer Vision and Pattern Recognition 2001, pp. 1-9.

Zhang, Cha, et al., "A Survey of Recent Advances in Face Detection," Technical Report Microsoft Research, Microsoft Corporation, Jun. 2010, 17 pages.

Office Action mailed on Feb. 25, 2014 for co-pending U.S. Appl. No. 13/591,778; 279 pages.

Office Action mailed on Jan. 17, 2014 for co-pending U.S. Appl. No. 13/457,158; 25 pages.

Final Office Action mailed on Oct. 21, 2013 for co-pending U.S. Appl. No. 13/457,150; 14 pages.

UK Search Report mailed on Nov. 26, 2013 for co-pending UK Application No. GB1311060.6; 4 pages.

UK Search Report mailed on Oct. 23, 2013 for co-pending UK Application No. GB1307409.1; 3 pages.

UK Search Report mailed on Oct. 28, 2013 for co-pending UK Application No. GB1307477.8; 4 pages.

* cited by examiner

DOCUMENT AND USER METADATA STORAGE

BACKGROUND

The advent of the Internet and computer networking has enabled many technologies to be spread out over several computers. A common architecture for providing services is the client/server architecture, which typically locates the server on a network where it can be accessed by many clients. However, firewalls can interfere with communications between clients and servers. As well, mobile users can be separated from their home networks and can lose access to servers on their home networks. Another common architecture is a cloud architecture, which places services on the Internet. However, although cloud services exist for providing file storage, not all services provided on a home network can be provided using currently-available cloud services.

Additionally, the advent of cloud file storage architecture has led to the increasing storage of files in the cloud. In many cases, it is advantageous to collect and store metadata about files stored in the cloud, but no agreement exists on where to store the metadata.

SUMMARY

Techniques are disclosed for providing services to a client device via a shared cloud service. In one embodiment, a method is disclosed that includes storing information on a first device relating to a subject, saving the stored information in a serialized format data file to the shared cloud service, the data file having a filename generated as a function of the subject, providing authenticated access to the data file for a second device via the shared cloud service, synchronizing a copy of the data file via the shared cloud service to the second device, the copied data file reflecting a single up-to-date state of the data file in the shared cloud service, and de-serializing the serialized format data file at the second device.

The subject can include one of a user and a file. The method can also include copying the de-serialized data into a database at the second device, collecting the information relating to the subject at the first device, sharing the data file among a plurality of users of the shared cloud service, identifying the subject using a globally-unique identifier, and saving the stored information in the serialized format data file in a metadata directory in a file hierarchy at the shared cloud service. The globally-unique identifier can be embedded in a filename of the serialized format data file, thereby identifying the subject of the data file by the filename, such that the information can be located in a particular location on the shared cloud service using the filename.

In another embodiment, a cloud data storage system is disclosed, including a per-user file-based cloud data store, for performing synchronization, authentication and storage functions for a data file stored at a remote computing device, a database at a local computing device for storing information pertaining to a subject, a file synchronization module at the local computing device for copying the data file from the remote computing device to the local computing device, a data export module at the local computing device for serializing the information from the database into the data file to be stored on the cloud data store, and a data import module at the local computing device for de-serializing the data file to recreate the information and for importing the recreated information into the database.

The subject can include one of a user and a file. A data import module can be provided for de-serializing a plurality of data files created by a plurality of users and shared among the plurality of users by the cloud data store, such that the data import module is for recreating information from a plurality of users to import information from multiple users into a single database. A data collection module can be provided for collecting information relating to a subject at the local computing device. The subject can be associated with a globally-unique identifier. The data export module can be configured to use a Javascript Object Notation (JSON) data format for serializing the information. The data export module can also be configured to store the data file in a metadata directory in a file hierarchy at the cloud data store.

In another embodiment, a networked computing system is disclosed, including a processor, a network interface coupled to the processor for communicating with a cloud data service, a data storage device coupled to the processor, and a memory coupled to the processor and including computer-readable instructions that, when executed by the processor, cause the processor to store information relating to a subject at the data storage device, save the stored information in a serialized format data file to the cloud data service via the network interface, the data file having a filename generated as a function of the subject, synchronize the serialized format data file with a plurality of networked computing devices via the cloud data service, de-serialize the serialized format data file to recreate the information relating to the associated user or file, and store the recreated information at the data storage device.

The subject can include one of a user and a file. The processor can also be caused to copy the de-serialized data into a database, collect the information relating to the associated user or file, share the data file among a plurality of users of the cloud data service, identify the associated user or file using a globally-unique identifier, embed the globally-unique identifier in a filename of the serialized format data file to allow the information to be located in a particular location on the cloud data service using the filename, and save the stored information in the serialized format data file in a metadata directory in a file hierarchy at the cloud data service.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods can operate, etc., in order to provide a thorough understanding of the disclosed subject matter. It will be apparent to one skilled in the art, however, that the disclosed subject matter can be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Metadata is often collected and stored relating to activities by users. This metadata can include, for example, user-visited web sites, documents edited by users, terms that the user has searched for, links the user has clicked on, and the contents of any of these documents. This data about data is termed metadata. In many cases this metadata is collected and stored at a server that also hosts the resource being accessed. As this server knows which files are being accessed, it can therefore collect and store metadata about the accessed files. For example, file metadata can be stored on the local disk of a machine by the operating system. Also, online purchase patterns can be stored on the web server hosting the web site, so that purchasing recommendations can be given to other users.

Storing metadata and providing network server services can thus be performed using a cloud data store as the backing data store. Using a cloud data store can enable synchronization, authorization, and storage functionality to be separated from the storage and retrieval functionality, allowing flexible and rapid deployment using existing cloud infrastructure.

Figure 1A:
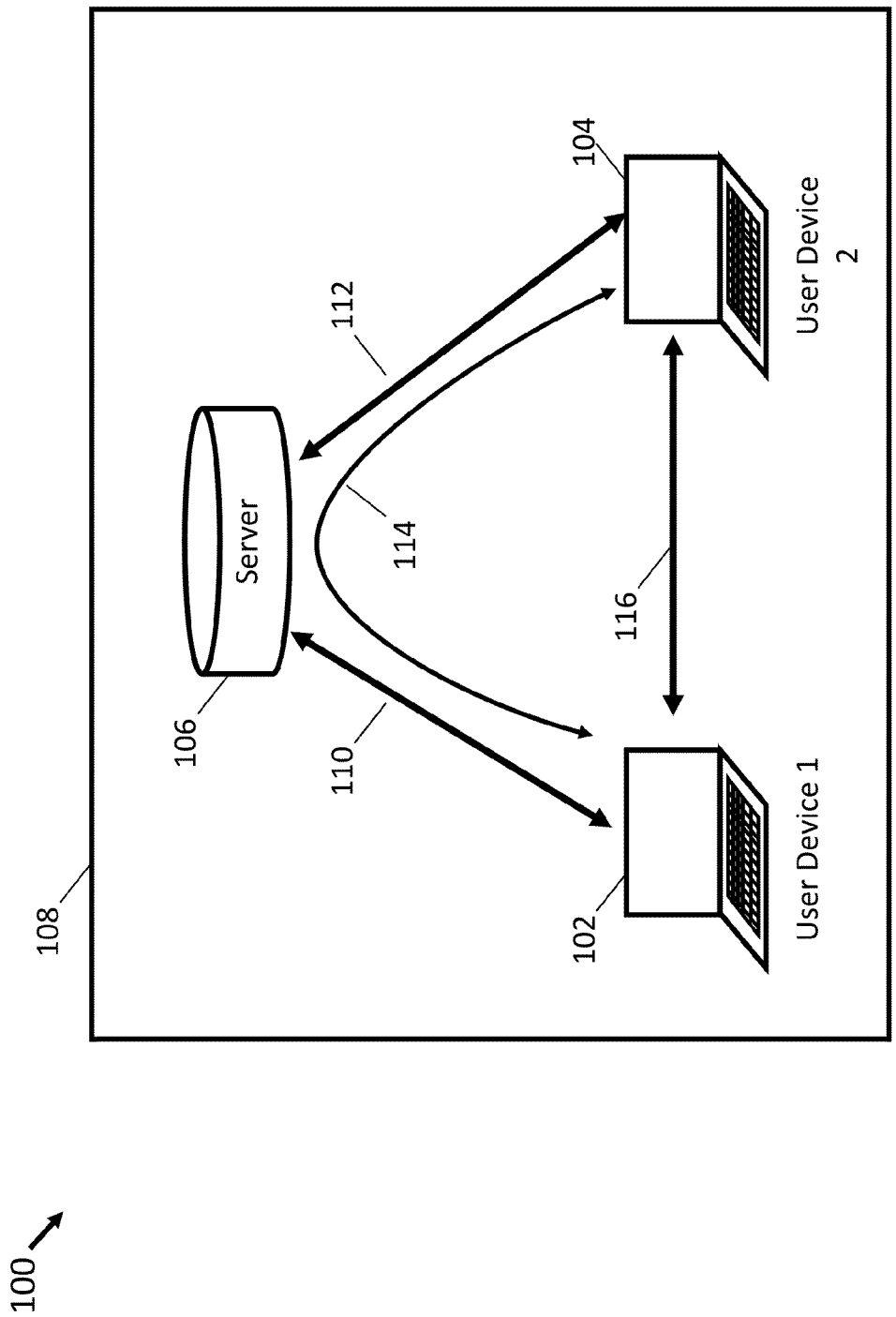
FIG. 1A is a schematic network diagram of an exemplary system that can provide network services.

FIG. 1A is a schematic network diagram of a system providing network services, in accordance with some embodiments. Network 100 includes firewall 108, which provides access to a private network. Firewall 108 can provide authentication services, network security services, and other services. User device 102 and user device 104 are part of the private network within firewall 108, can interact with server 106. Server 106 can provide services to user devices 102 and 104, including file services. Communication link 110 can provide communication between user device 102 and server 106. Communication link 112 can provide communication between user device 104 and server 106. Communication link 114 can provide communication between user device 104 and user device 106, as well as with server 106, within the secure network that is provided inside of firewall 108. User devices 102 and 104 can be, for example, computers, laptops, desktops, smartphones, tablets, appliances, routers, or other computing devices with networking capability. Server 106 can also be a single server, in which case no synchronization is needed. Server 106 can also be a plurality of servers, and/or a plurality of synchronized file servers. Server 106 can provide database functionality for storing information about files stored at server 106, including file metadata information. Server 106 can also provide database functionality for storing information about users, including information about activity by one or more users at user device 102 and user device 104. User device 102 and user device 104 can rely on server 106 to provide information, such as metadata information, file content summary information, document access status and information, document suggestions, document revision control and versioning, document edits performed by one or more users, and other information.

Figure 1B:
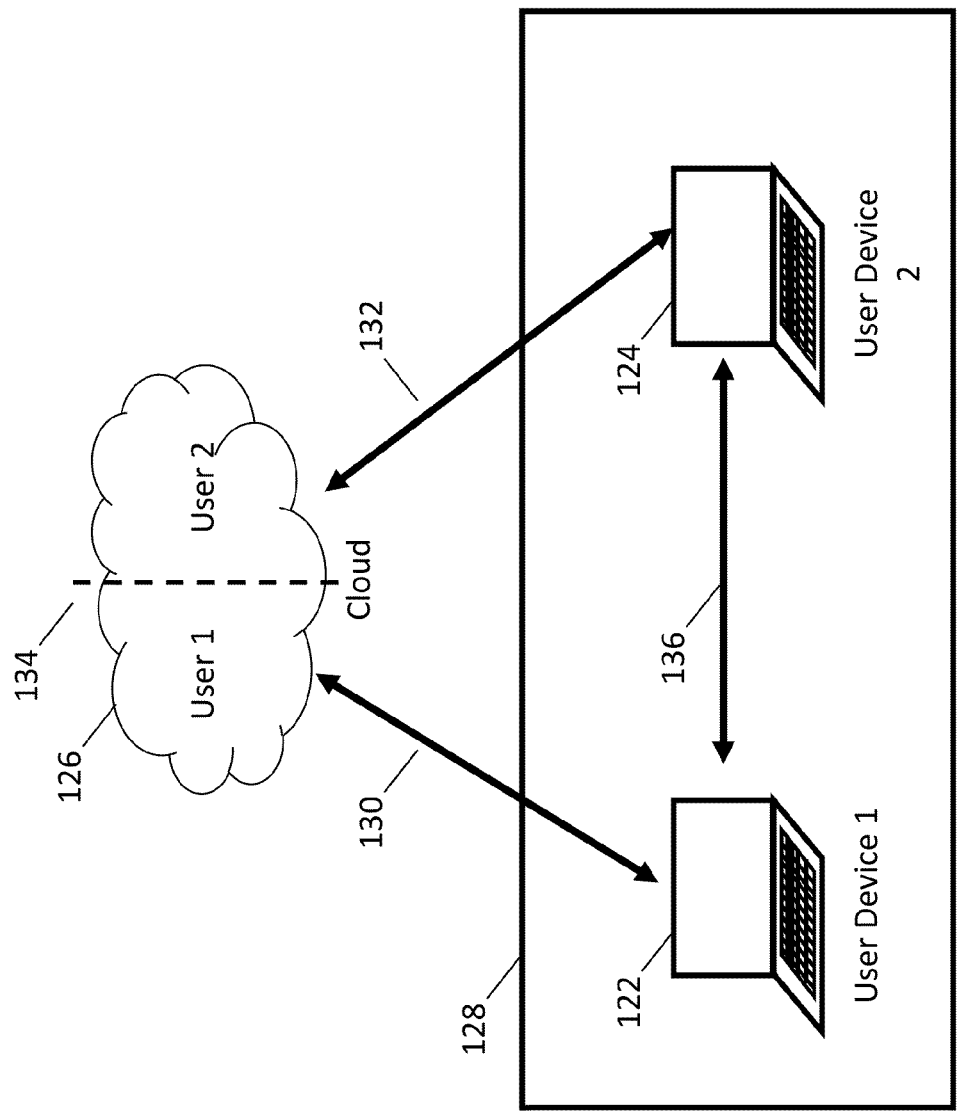
FIG. 1B is a second schematic network diagram of an exemplary system that can provide network services.

FIG. 1B is a second schematic network diagram of a system providing network services, in accordance with some embodiments. Private network 128 can include user device 122 and user device 124. Cloud 126 can exist outside of private network 128 and can consist of one or more servers for providing file storage functionality. User device 122 and user device 124 can communicate with each other using communication link 136. User device 122 can communicate with cloud 126 using communication link 130. User device 124 can communicate with cloud 126 using communication link 132. However, cloud 126 can be separated into individual sections by logical divider 134, such that communication link 130 only provides access to data within cloud 126 that is owned by the logged-in user at user device 122, and such that communication link 132 only provides access to data within cloud 126 that is owned by the logged-in user at user device 126. In the configuration thus described, files can be stored by users using user devices 122 and 124 in cloud 126, and users can be assured that their files will not be shared with other users without permission. While cloud 126 is outside of private network 128, cloud 126 can provide authentication functionality to enforce such security rules.

Private network 128 can be protected by a firewall, in some embodiments. In some embodiments, users are enabled via special user interface functionality to share files and/or folders with other users. Designating files to be shareable can permit files to be read, written, or both, according to various embodiments. Files can be stored at cloud 126 and at user device 122 and 124. When files are stored at user device 122 or 124, the respective user device can collect information, such as metadata, about the files. When the files are stored at cloud 126, cloud 126 can collect information, such as metadata, about the files, by performing processes at the server using the data within the files on the owner user's behalf. Cloud 126, however, typically cannot access information on user device 122 or 124 without specific configuration and/or support being provided by the user devices. If a single user accesses the same file in the cloud first from user device 122 and second from user device 124, user device 124, without specific synchronization functionality or data being stored first in cloud 126, preferably cannot access configuration, metadata, and other information residing on user device 122.

Figure 2:
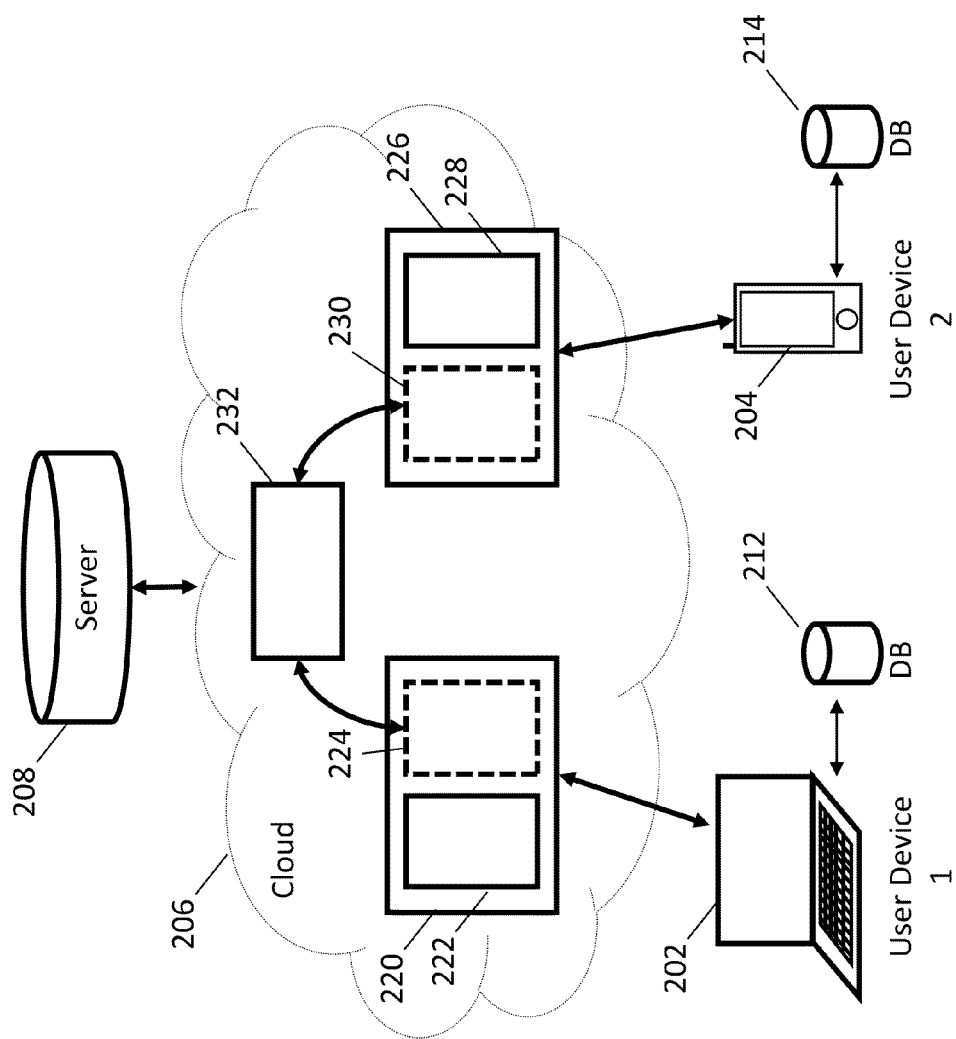
FIG. 2 is a schematic network diagram of an exemplary system that can provide network services.

FIG. 2 is a schematic network diagram of a system, in accordance with some embodiments. User device 202 and user device 204 can communicate with cloud 206. Cloud 206 can communicate with server 208. User device 202 can also communicate with local database 212. User device 204 can also communicate with local database 214. Cloud 206 can include file storage 220 dedicated to a first user, file storage 226 dedicated to a second user, and shared file storage 232, which can be shared between both the first and second users. File storage 220 can include private file area 222 and a link 224 to shared file storage 232. Similarly, file storage 226 can include private file area 228 and a link 230 to shared file storage 232. A single logical copy of shared file storage 232 can be maintained, such that both the first and second user can read the files in shared file storage 232, and such that when changes are made to files in shared file storage 232, both users receive the updates. In some cases, one user can have write access; in other cases, both users can have write access.

In FIG. 2 and in accordance with some embodiments, User 1, using user device 202, can access files stored on a cloud data store or cloud data service 206. These files are preferably owned by User 1, shown as file storage 220. In some embodiments, certain files owned by the user can be shared with other users, such as User 2. These shared files are shown as shared file storage 232. Cloud data service 206 can provide authentication for each user, so that User 1 can access private data store 220 but not private data store 226, and that User 2 can access private data store 226 but not private data store 220. Cloud data service 206 can also provide access control for individual files, and cloud service 206 can also prohibit a single file from being edited simultaneously by multiple users, in some embodiments. Cloud data service 206 can also provide synchronization of files between user devices 202 and 204 and the cloud 206, such that the cloud maintains an up-to-date copy of any files as they are modified by User 1 or User 2. Cloud data service 206 can also provide a user interface for managing synchronization, authentication, and sharing of files, in some embodiments.

In certain embodiments, User 1 can store and retrieve arbitrary information as serialized data files, and these files can be stored in storage area 220. Some of the serialized data files can be part of shared file storage 232. Serialized data files can be files in one or more formats, including Javascript Object Notation (JSON), Extensible Markup Language (XML), binary data formats, text-based data formats, plain text, or other formats. Serialization of the data can be performed by writing the data from memory to a non-transitory medium in one or more of these or other formats. Serialized data files can be data files that store all or part of the contents of a database in a format that preserves the structure of the database, but that is capable of being saved in a data store. When the serialized data files are read by a compatible module, the data files are capable of being transformed into an in-memory data structure or a database.

In certain embodiments, the data files can be constructed from a database such that each data file provides information about a specific user, or about a specific file, or about another object. The specific information in multiple files can be read and combined by a software module that de-serializes the data, and coalesces or unifies the de-serialized data into a single database. Each data file can be said to contain a shard, or a subset, of the full database, pertaining to a particular user or file or other object. Each data file can be stored with a filename that reflects the structure of the full database, and that can include identifying information about the user or file or other object the data file relates to. The identifying information can include a unique global identifier (GID), such as a global user ID (GUID) or global file ID, in the filename, or in the path name where the data file is stored, or both.

User 1 can access both his own files in private storage area 222 and shared files in shared file storage 232, and can use the data stored in multiple files across these storage areas to construct a database or single coherent data store. This database can be stored in memory, on disk, in a non-volatile memory, in database 212, or in another location. This database can provide access to information relating to users, relating to files, or both. In certain embodiments, User 1, or User 2, or both, can retrieve information from cloud 206 to construct a database or coherent data store. The database can use both private files from private storage areas 222 and 228, and shared files from storage area 232. If files are shared between User 1 and User 2, and those files contain information in the form of serialized data files, both User 1 and User 2 can use the serialized data files to share data with each other, such that User 1 and User 2 maintain up-to-date copies of the same data. Further, User 1 and User 2 can de-serialize the data to store copies of the data in databases 212 and 214. The copies of the data can be synchronized by cloud 206, which can perform the underlying data storage and synchronization functions needed to provide shared files. In this way, both User 1 and User 2 effectively have access to copies of the same database, which can be kept in sync by cloud 206.

In accordance with some embodiments, synchronization of files with cloud 206 can be designed so as to reduce the possibility of malformed, inconsistent, or corrupted data entering cloud 206, and in particular from corrupting shared storage area 232. In some embodiments, User 1 can be able to read all files in shared storage area 232, but can only be allowed to write data files pertaining to particular users or particular files. User 1 can, for example, be allowed to write only data files pertaining to files owned by User 1 and stored in private storage area 222, or data files pertaining to User 1, or data files pertaining to files owned by User 1 and stored anywhere. User 2 can be allowed to read data files pertaining to User 1's files, but User 2 can be disallowed from writing to such files. By providing access control in this manner, User 2 can be prevented from corrupting or destructively modifying data stored by User 1, and vice versa. In other embodiments, users can be permitted to write and save data files pertaining to any files by causing all files written by a given user to have a filename prefix associated with that user, in the form of a user global unique ID (UserGuid), combined with a filename suffix associated with the file, in the form of a file global unique ID (FileGuid). Users can be enabled to edit only files that have a given user's own filename prefix. The above methods can allow multiple users to perform edits without blocking other users' edits, thereby enabling simultaneous updates of metadata. In some embodiments, locking can be used. In some embodiments, no locking is needed, and individual users will not edit each other's documents. Other methods for ensuring that one user does not edit another user's files can be contemplated as part of the present disclosure.

In accordance with some embodiments, user device 202 can be a computer, such as a laptop computer or desktop computer, running MICROSOFT WINDOWS, LINUX, MAC OS X, or another operating system. User device 202 can also be a smartphone, such as an APPLE IPHONE or SAMSUNG GALAXY smartphone, a user terminal running the GOOGLE ANDROID operating system, the iOS operating system, or the MICROSOFT WINDOWS phone operating system, or other mobile device. In some embodiments, user device 202 can be a tablet, such as an APPLE IPAD or GOOGLE ANDROID tablet. In some embodiments, user device 204 can be any of the user devices described above. In some embodiments, custom client software can be provided to allow or enhance access to cloud 206. The custom client software can be used to provide file access functionality, data collection functionality, metadata storage functionality, and/or user interface functionality. The custom client software can also provide database ingest functionality, data file serialization functionality, data file de-serialization functionality, and/or other functionality for interfacing with database 212 or database 214. Cloud store 206 can be a DROPBOX data store, an AppSense DATANOW data store, an AMAZON S3 storage data store, a BOX.NET data store, an enterprise private cloud storage, or other data storage cloud functionality. Custom client software can provide integration with the underlying operating system for the cloud data store and/or for the database functionality, including database ingest, database serialization and de-serialization, and other functions. For example, integration with the underlying operating system can enable the client software to reload new data files as the cloud data store pushes updated data files to the local file system, so that the client software's database is always up to date. In some embodiments, a notification can be sent to the user device when another user has updated metadata in the cloud.

Figure 3:
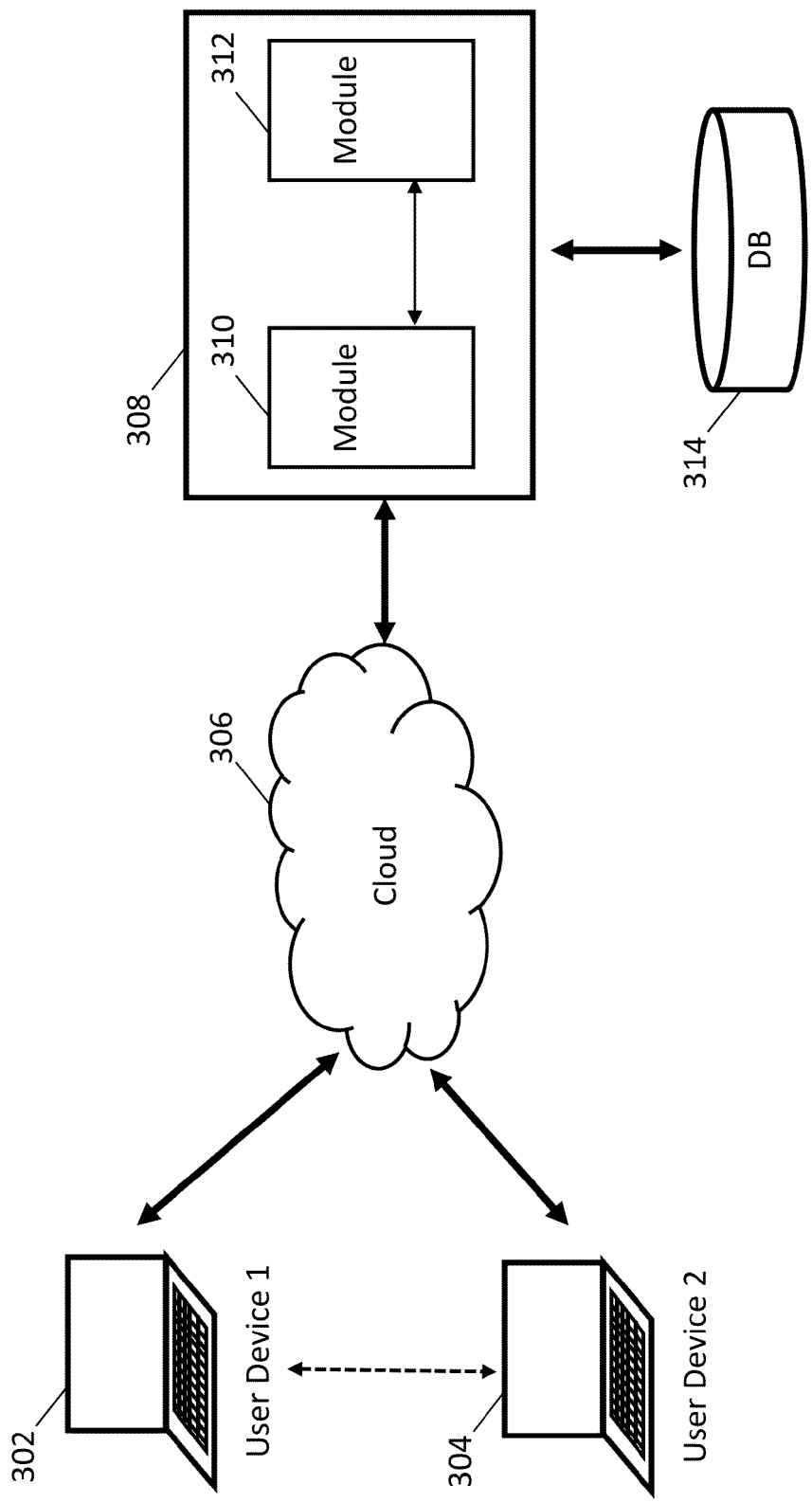
FIG. 3 is an exemplary network diagram for providing database server functionality at a server.

FIG. 3 is a network diagram for providing database server functionality at a server, in accordance with some embodiments. User client 302 and user client 304 can connect to cloud 306. Cloud 306 can connects to server 308. In some embodiments, server 308 can be within cloud 306. Server 308 can include functional modules 310 and 312.

Figure 4:
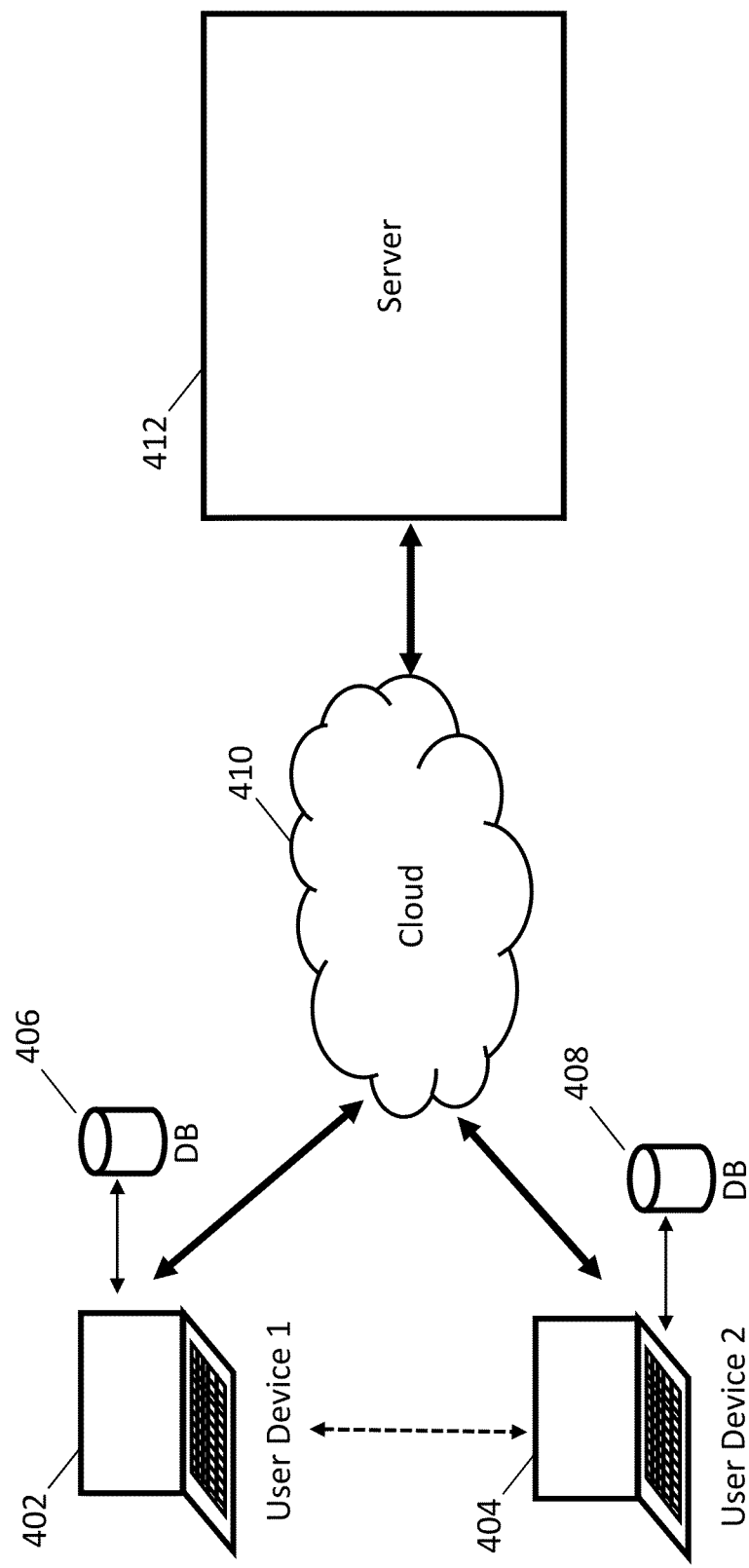
FIG. 4 is an exemplary network diagram for providing database functionality at one or more clients.
Figure 5:
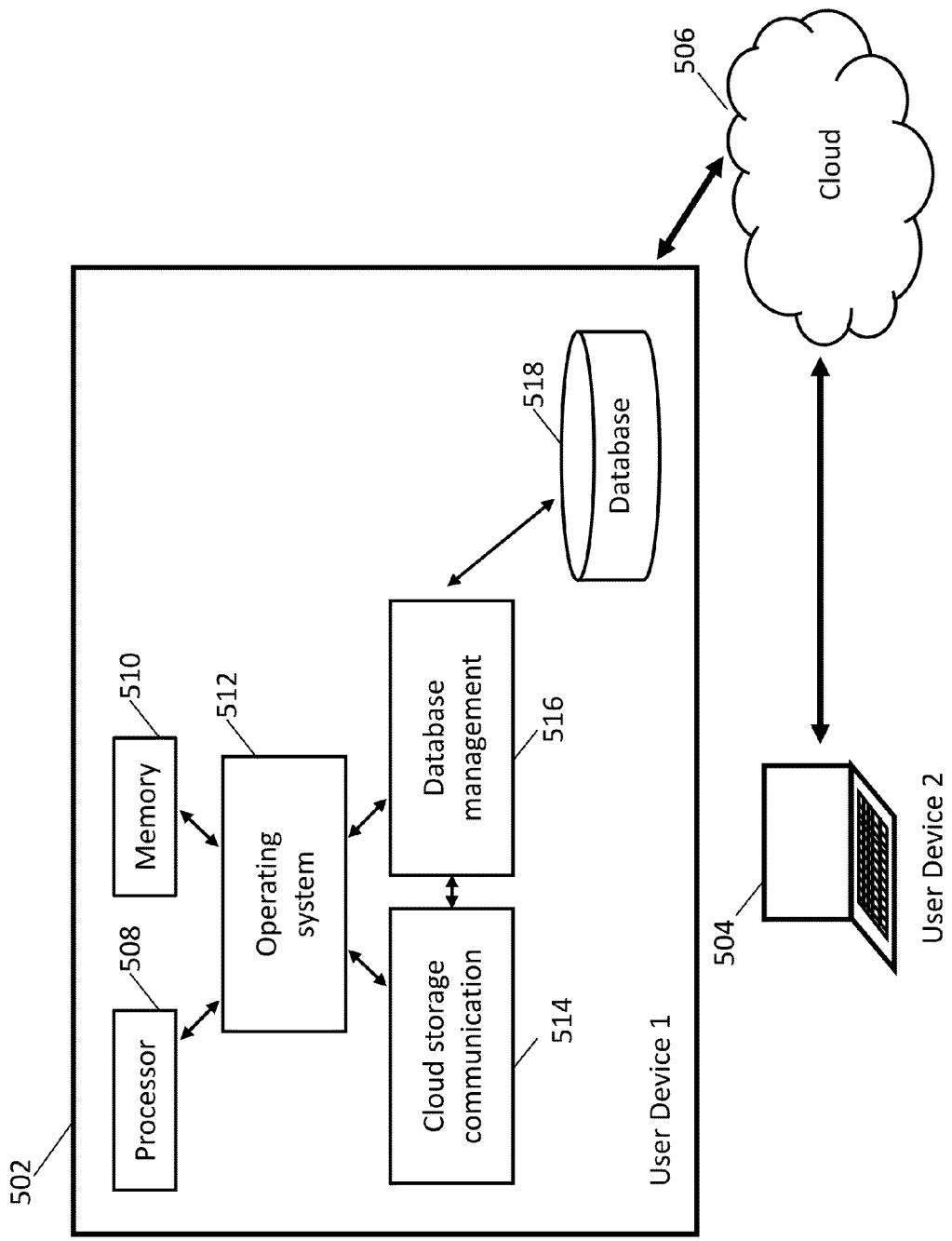
FIG. 5 is a logical architecture diagram of exemplary software modules at a user client.

User clients 302 and 304 can be ordinary, un-modified clients and/or they can be modified clients as described further herein and as shown in relation to FIGS. 4 and 5. User clients 302 and 304 can be, for example, desktop computers, laptop computers, mobile devices, mobile phones, tablet computers, or other computers. User clients 302 and 304 can be servers or can have server functionality, as well as user-facing functionality. User clients 302 and 304 can be connected to each other via a network, or they can be disconnected from each other. User clients 302 and 304 can be connected to cloud 306, and can be connected via one or more of the public Internet, a local intranet, a wireless network, a private wireless network such as a cellular network, or via another type of network connection. More users and user clients can be contemplated, in the spirit of the present invention.

Cloud 306 can be a network service provided via one or more servers via a network connection, as described above. Cloud 306 can be a network providing connectivity, such as a network providing access to the Internet. Cloud 306 can provide network connectivity, such as Internet connectivity, file service or file sharing service, or another service. Cloud 306 can allow user clients 302 and 304 to send data to, and save data in, the cloud 306, which can subsequently be made accessible to the same user clients from cloud 306; this data can include files and/or folders. In some embodiments, cloud 306's file services can be integrated into the operating systems of user clients 302 and 304. Cloud 306 can provide one or more of: access control functions; authentication functions; synchronization functions; and multi-user sharing functions. Authentication functions can be provided such that a user can log in to a user account and thereby gain access to all files and privileges made available for that user, including files and folders shared with that user by another user. A single user can use both user clients 302 and 304, and if this is the case, cloud 306 can synchronize any or all changes made at one user client to the other user client, so that the user does not perceive any difference between the data stored at user client 302 and at user client 304. When multiple users access cloud 306, as shown in FIG. 3, cloud 306 can enable users at user clients 302 and 304 to configure which, if any, other users can be permitted to access files saved at cloud 306 by that particular user, and if a user indicates that another user can be permitted to access certain shared files, any changes to the shared files can be synchronized from one user and one user client to other users and other user clients.

Server 308 can be in communication with cloud 306, and can include functional modules 310 and 312. Server 308 can be responsible for providing one or more of the functions described above in reference to cloud 306. Server 308 can also be responsible for performing other functions, such as providing web or hypertext transfer protocol (HTTP) service. In some embodiments, files and data can be stored in server 308, in addition to, or in place of, in cloud 306. In some embodiments, server 308 can be part of cloud 306; in other embodiments, cloud 306 can be part of server 308. In the case that server 308 performs certain cloud functions, these functions can be provided by functional module 310. In some embodiments, cloud 306 can provide file service, and server 308 can provide additional applications built on top of these file services; these additional applications can provide additional application programming interfaces (APIs) to user clients 302 and 304. Functional module 310 can intercept these additional application API calls by user clients 302 and 304, in order to communicate with custom software residing in and executing on user clients 302 and 304. These additional applications can be document suggestion using metadata collection, or document presentation with layers, or other functions, as presented further herein. Functional module 310 communicates with functional module 312 to store and retrieve application data, including storing and retrieving file data that can be used to provide application services. In one example, file metadata and user metadata is collected and stored in files at server 308. When requested by an application, the metadata can be retrieved from the stored files and used by the application. Collection can be made possible by, or facilitated by, the fact that files are physically co-located at the server. In some embodiments, functional modules 310 and 312 can be server processes running on server 308.

In some embodiments, functional module 312 can be a database management module, and can provide access to a database 314. Database 314 can reside on server 308, in some embodiments, or can be part of cloud 306, in some embodiments. Database 314 can be an in-memory database, or can be a structured query language (SQL) database, such as a MYSQL™, POSTGRESQL™, ORACLE™ or other database. Database 314 can also be a flat file, a data dictionary, a key-value store, or a NoSQL database or other database, and can be located on a single physical server, or many physical servers. Database 314 can use cloud 306's file storage to retrieve and store information to and from user clients 302 and 304, and can store information used by the additional applications executing on server 308 and at user clients 302 and 304. In some embodiments, the synchronization functionality provided by cloud 306 is thereby leveraged in order to provide consistent data storage for these additional applications.

FIG. 4 is a network diagram for providing database functionality at one or more clients, in accordance with some embodiments. User client 402 and user client 404 can be similar to user client 302 and user client 304. However, user clients 402 and 404 can run custom client software, which will be described below. User client 402 can be connected to user database 406. User client 404 can be connected to user database 408. User clients 402 and 404 can be connected to cloud 410, and via cloud 410 to server 412. Cloud 410 can be similar to cloud 306, and can be a network providing connectivity to server 412, or can be a cloud service providing multiple services, such as authentication, access control, and sharing, in conjunction with server 412. Server 412 can be a network server running network services. In some embodiments, no custom server is required, and any third-party cloud service can be used that provides certain functionality. These network services can include standard file sharing or file server functionality, including file transfer protocol (FTP), secure file transfer protocol (SFTP), common Internet file system (CIFS), web-based distributed authoring and versioning (WebDAV), Github, or any other protocol providing file service capabilities. Server 412 can be a plurality of network servers. Server 412 can be a server providing file service functionality using resources within a corporate intranet, or using third-party resources via the public Internet, such as APPSENSE DATANOW™, DROPBOX™, BOX.NET™, GOOGLE DRIVE™, APPLE ICLOUD™ AMAZON S3™, or another Internet service. A variety of services can be used, such that different services can be used and users can transfer or transition between services. This goal can be accomplished in some embodiments by using only standard file storage service functionality that is common to all of the above services and/or protocols. Standard file storage service functionality can include functions such as uploading files, downloading files, deleting files, and creating folders and directory listings. The file storage service can be owned by another party rather than the party making use of the file storage services, and the file storage service need not be within a corporate network or intranet. Although no specific server software is required, in some embodiments, additional functionality can be provided by the use of custom APIs for specially-designed clients, such as described above in FIG. 3 and accompanying text.

User client 402 can be connected to user database 406. User database 406 can be an in-memory database, a SQL database, a flat file, a key-value store, or other standard database for storing information, and contains information pertaining to users and files. User database 406 contains information that can be used by multiple applications User client 404 also is connected to user database 408, in a manner similar to that of user client 402 and user database 406, in some embodiments. User clients 402 and 404, in some embodiments, execute custom client software for collecting information and performing application services. In some embodiments where user clients 402 and 404 are smartphones and/or tablets, custom client software can be provided to access remote files stored at server 408. Where user clients 402 and 404 are desktop Windows and Mac systems, access can also be provided using either a custom client when accessing files, to collect and store the metadata, or custom software to provide access integrated into the filing system.

User clients 402 and 404 can store the collected information in user databases 406 and 408, respectively, and also in a collection of files at server 412 via cloud 410. The collection of files can be located in a shared folder, in some embodiments, thereby allowing other user clients to update their local databases using the data stored in the shared folder. Simultaneous updates of data or metadata can be performed by user clients 402 and 404, in some embodiments. This is made possible by separating data or metadata stored at server 412 into separate files, so that updates can be performed on different files at the same file without having to save all updates to a single data file or database at server 412. This also helps ensure that updates to metadata by user client 402 are not overwritten by an update by user client 404.

Data or metadata can be separated out by file and user, such that metadata about, e.g., a specific file is stored in a file given a filename reflecting the name and/or path of the relevant file, as described below. Users can be provided authenticated access and access control, such that a user can only modify metadata files relating to files that he or she owns, or relating to files that have the user's user ID as a suffix, or both. In some embodiments, a notification system can be used to alert a user, or other users, about updates to metadata stored at server 412. The notification system includes a software agent running on server 412.

FIG. 5 is a logical architecture diagram of software modules at a user client, in accordance with some embodiments. User client 502 can connect to cloud 506. User client 504 can also connect to cloud 506. User client 502 includes processor 508, memory 510, operating system 512, cloud storage communication module 514, database management module 516, and database 518. Cloud 506 can provide file storage, file synchronization, authentication, and other services as described elsewhere in this application (e.g., FIG. 2 and accompanying text). Cloud 506 can allow connections from, and provides services to, a plurality of clients, including user client 504.

Cloud 506 can provide database server functionality, but user client 504 can also provide database server functionality using database management module 516 and database 518. Processor 508 executes instructions stored in memory 510. These instructions can include instructions for storing and retrieving information to and from cloud 506 via cloud storage communication module 514.

Cloud storage communication module 514 can provide processing to enable communication to and from cloud 506 with user client 504. Cloud storage communication module 514 can interact with operating system 512 to enable the operating system to use cloud 506 in a manner similar to that of local storage. Cloud storage communication module 514 can monitor file system operations performed by operating system 512 to initiate synchronization of files between user client 504 and cloud 506. Cloud storage communication module 514 can also provide functions relating to authentication, security, and other functions where interoperability with cloud 506 is useful. Cloud storage communication module can also communicate with database management module 516. Cloud storage communication module 514 can provide access control in conjunction with cloud 506.

Database management module 516 can provide functions as described herein for communicating with database 518, such as importing data from data files stored in cloud 506 into database 518, exporting data from database 518 into cloud data files for storage in cloud 506, and other functions. In some embodiments, database management module 516 can be used to read and write data directly to and from data files stored in cloud 506. In such embodiments, database 518 is not needed to provide data storage. Reading and writing data to and from data files can be performed by serializing data that is stored in memory, or in database 518, and writing the serialized data into files. Data to be written can additionally be formatted according to a particular format or syntax, such as Javascript Object Notation (JSON), eXtensible Markup Language (XML), plain text, as a database dump format from a database such as MYSQL™ or ORACLE™, or any other convenient format.

Database management module 516 can determine where to store data files in the filesystem of cloud 506 in some embodiments. Database management module 516 can also select and determine names of the data files for storage in cloud 506, in some embodiments. In conjunction with its function of determining filenames, database management module 516 can also create and retrieve global unique identifiers (GUIDs). GUIDs can be used for files, for users, or other objects. GUIDs can be created by performing a mathematical operation such as an MD5 hash operation on an input string, such as a username, content of the file, a filename, or a pathname including a filename, among other potential input strings. The resulting output can be directly used as a GUID, or can be truncated, according to some embodiments.

GUIDs can be used as part of filenames. For example, if metadata about a particular user is being stored, the filename of the data file can include a user GUID for the particular user. If metadata about a particular file is being stored, the filename of the data file can include a file GUID for the particular file. Filenames can be used to store other information as well, as described elsewhere herein.

Database 518 can provide functions as described herein, for saving data, including metadata, to cloud 506. Database 518 can be stored in memory 510, in some embodiments. Database 518 can be a database such as MYSQL™, POSTGRESQL™, or ORACLE™, a data dictionary, a key-value store, or another database. Database 518 connects with database management module 516, providing functionality for importing and exporting the contents of database 518 to cloud data store 506.

Figure 6:
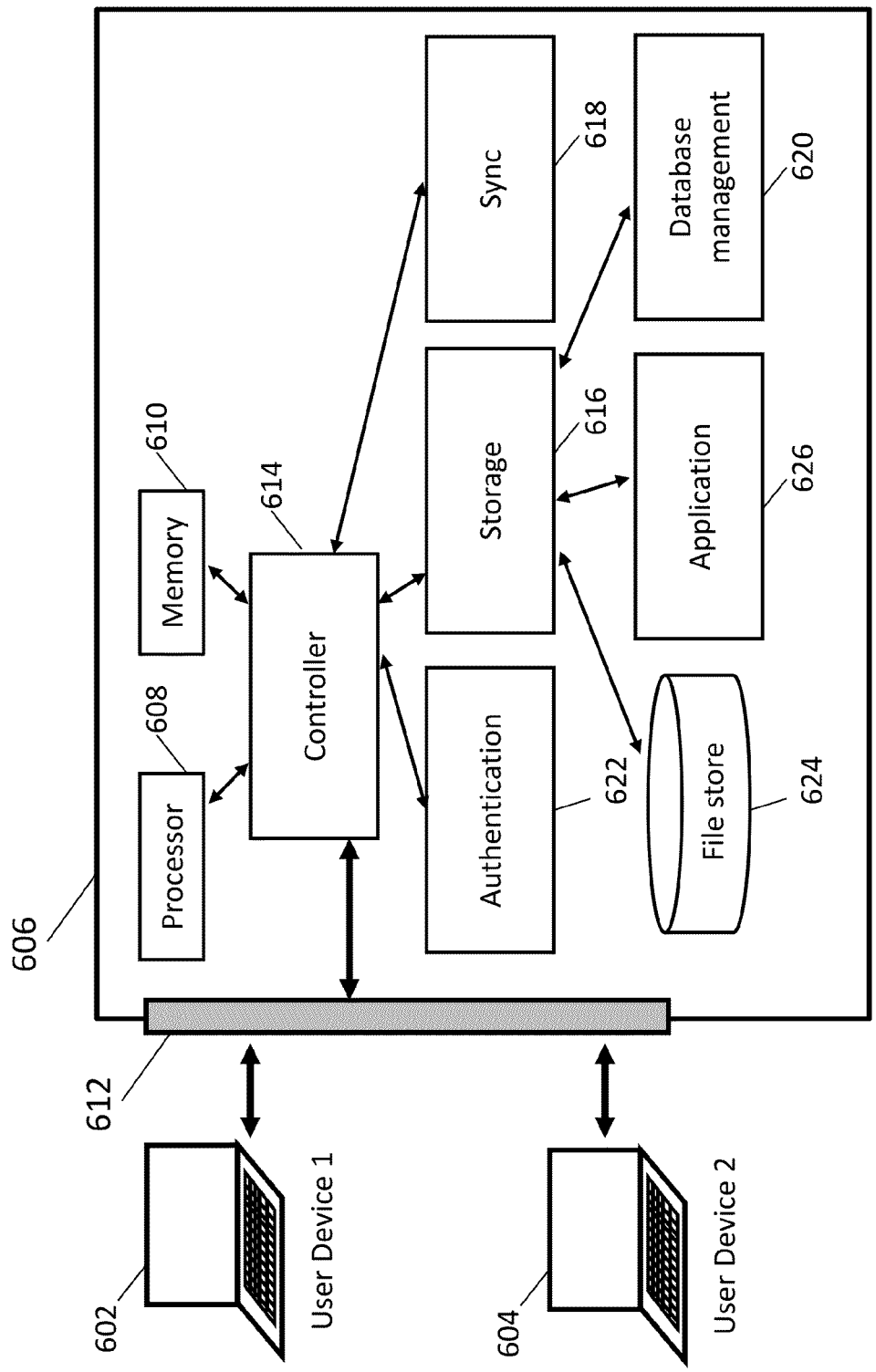
FIG. 6 is a logical architecture diagram of exemplary software modules at a server.

FIG. 6 is a logical architecture diagram of software modules at a server, in accordance with some embodiments. User device 602 and user device 604 can be in communication with server 606. Server 606 can contains processor 608, memory 610, network interface 612, controller 614, storage module 616, synchronization module 618, database module 620, authentication module 622, file store 624, and application module 626. Server 606 can provide various functionalities, as described further herein.

User devices 602 and 604 can be able to communicate with server 606 in order to store and retrieve files from server 606, thereby using server 606 as a cloud data store. User devices 602 and 604 can also incorporate database server functionality, in some embodiments, as described above in FIG. 5, or can be configured with software that allows them to communicate with server 606 for storing metadata. Server 606 is configured to operate as a cloud data store, such that user devices 602 and 604 can instruct server 606 to save and retrieve files using a file sharing protocol, including one of file transfer protocol (FTP), secure file transfer protocol (SFTP), common Internet file system (CIFS), web-based distributed authoring and versioning (WebDAV), Github, or any other protocol providing file service capabilities. Network interface 612 receives information over a network from user devices 602 and 604, and communicates the received information to controller 614. Controller 614, which executes on processor 608 and stores instructions and data in memory 610, receives communications from user devices 602 and 604 via network interface 612 and sends authentication access requests to authorization module 622. Controller 614 can also receive file storage requests and file retrieval requests using the file sharing protocol and sends these requests to storage module 616. Storage module 616 can identify the file or files to be saved or retrieved, and additionally can send instructions to storage system 624 to save or retrieve the file data. In some embodiments, storage system 624 is a disk drive, a solid-state drive, a database, a network-attached storage device or other network storage device, or other storage system. Controller 614 can communicate successful file transfer information to sync module 618, which can ensure that if a user is using more than one machine, or if the user has designated a file or folder for sharing with other users, each machine is synchronized with the latest-saved version of the file, folder, or shared file or folder. Sync module 618 can send and retrieve data frstorage module 616 to perform synchronization functions.

Database management module 620 is in communication with storage module 616, and can be aware of when files are saved or stored by storage module 616, in some embodiments. When files or data are stored by a user, and are marked as belonging to a particular directory or with a particular filename, these files can be processed by database management module 620 after being stored to extract data and to save the data in a database at server 606. The use of particular filenames or destination directories can be a signal to database management module 620 to review these files for information to be added or deleted from a database. The database can take many forms, as described elsewhere herein, and can include a SQL database, a flat text file, an in-memory data dictionary or other types of database. In conjunction with storage module 616, database management module 620 can detect changes made by any user, so that in a multi-user system, the database can be updated by more than one user. Database management module 620 can also write changes to the data via storage module 616, in some embodiments.

Application module 626 is also in communication with storage module 616, and can provide a number of functions relating to specific applications. More than one application module can be provided, and each application module can provide functions that utilize one or more of the functional modules in server 606. In one embodiment, described below with reference to FIG. 8 and corresponding text, application module 626 is a statistics module that stores and retrieves statistics regarding file accesses. When file access operations are performed, such as file openings, closings, deletions, and modifications, statistics collector receives that metadata from storage module 616, and updates a record of metadata that is specific to the affected file. Metadata stores for each file are in turn stored back to storage module 616 as serialized data files, to be subsequently synchronized to any necessary devices by synchronization module 618 and processed by database management module 620. File metadata is stored in specially-named files, as described elsewhere herein. In another embodiment, application module 626 is a layer metadata storage system, as described below with reference to FIGS. 12-13 and corresponding text.

Figure 7:
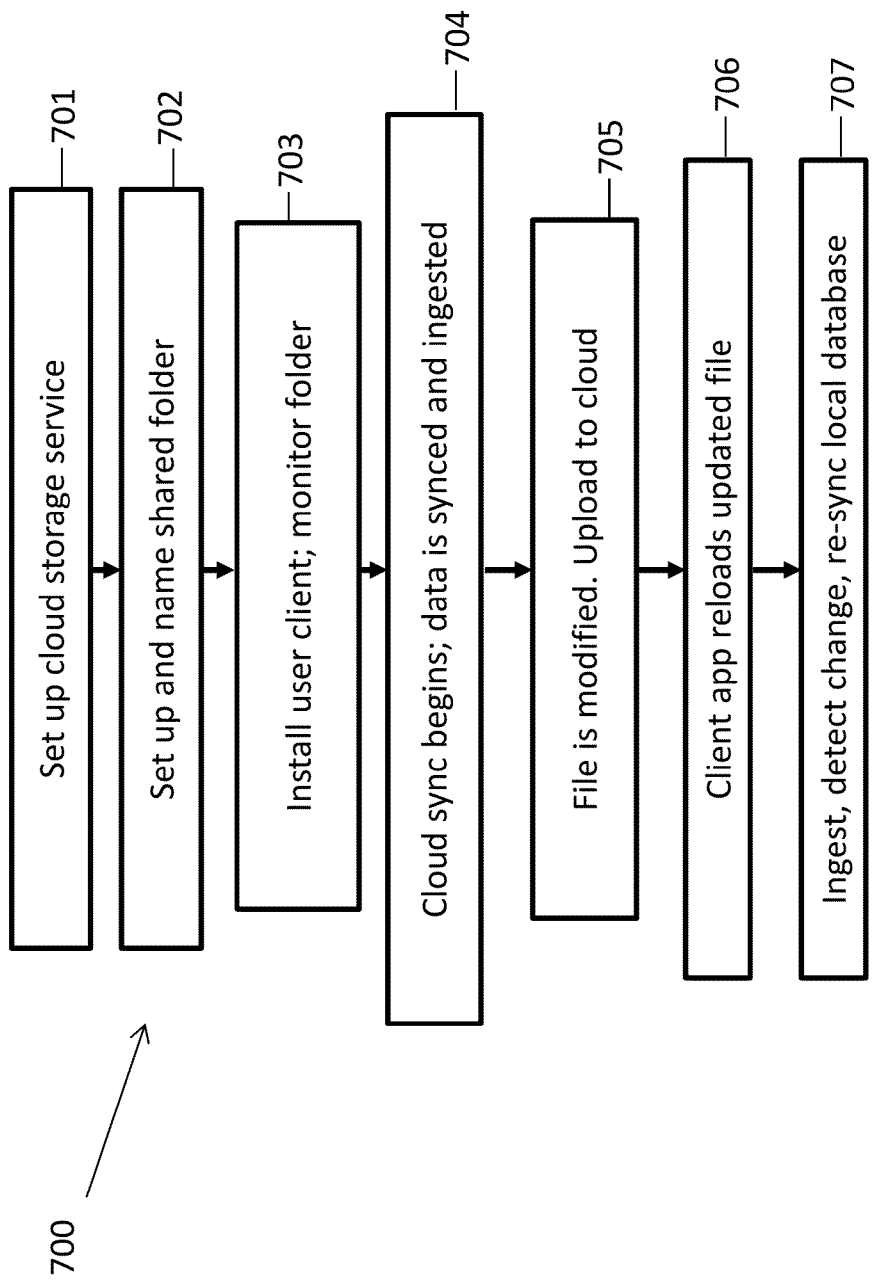
FIG. 7 is a flowchart indicating the exemplary interaction of a cloud data store and a client application.

FIG. 7 is a flowchart indicating a process 700 including steps performed during a setup operation to permit metadata to be shared, in accordance with some embodiments. The process 700 is exemplary only and can have stages added, removed, altered, and/or rearranged.

At step 701, the underlying cloud storage service is set up. This step can involve allowing a user to set up a username and password with the cloud service, downloading software for providing cloud storage service and installing the software, and creating or associating necessary directories with the cloud storage service. This step can alternatively involve, for a user who already has access to the cloud storage service, entering the previously-established user authentication credentials to enable the cloud storage service.

At step 702, a directory is created on the cloud storage service for the use of the multi-user metadata cloud database management functionality. This folder can be given any arbitrary name, such as ".AS_METADATA." The name can have a prepended period to hide the directory on certain UNIX and Mac OS X operating systems. The directory can have the same name for all users within an organization, for simplicity and ease of management. Directories within this main metadata directory, such as a Users directory and a Files directory, can also be created. No files need to be created at this time.

In some embodiments, additional directories can be created to simplify separation of application data. Each application accessing data in the cloud metadata folder can be considered a data user. Putting all metadata for data to be accessed by each application into separate folders, one folder per application, reduces the likelihood of data corruption and increases flexibility for assigning names to files and directories. In some embodiments, the application can have an application global unique identifier (ApplicationGUID), which can be made part of the name of the application-specific metadata directory.

At step 703, a client application is downloaded and/or installed by the user. This user client provides access to the metadata cloud database. The client application operates as described above in FIG. 4 and corresponding text, so that the ".AS_METADATA" folder can be used as the data store and so that individual files can be used to provide storage for metadata regarding particular files and users. The client application can maintain a local cache of the information in the metadata directory, and the local cache can be a database, an in-memory database, an in-memory data dictionary or other logical data structure. The client application is able to detect when files have changed within the directory, and when a change is detected, the client application can re-read the information in the directory to synchronize its local database with the cloud database. The client application locates the shared metadata folder and begins monitoring it.

At step 704, if the setup has completed successfully, and if information exists in the cloud that has been shared with the current user, this information is retrieved from the cloud. This triggers the client application to read some or all of the files in the metadata directory, thereby bringing the local copy of the metadata cloud database up to date. This step completes the setup operation, and the system is ready to provide data for applications built to use data from the cloud database.

At step 705, a file within the metadata directory is modified, either locally or remotely by another client. This causes the underlying cloud database to upload the file to the cloud. At step 706, the client application re-reads the file that has been modified and updates its local database. Although the upload of the file via the cloud potentially causes other metadata cloud database clients to synchronize their copies of the file and refresh their local databases as well, no signal is sent from the local client application to any other client applications; instead, the refresh functionality is triggered by the automatic synchronization feature provided by the underlying cloud storage.

At step 707, a file within the metadata directory is downloaded from the cloud due to a remote data update. The local client application detects that the file has changed, and the application re-reads the file that has been modified and updates its local database. This operation provides synchronization of data in the local database with the underlying cloud data store, which is kept by the cloud data store in a state of consistency. In addition to synchronization of data due to updates to the local filesystem, the client application can support a direct synchronization command, in some embodiments, causing the application to synchronize its data to the current state of the cloud data store.

File Metadata Tracking for Document Suggestion

A non-limiting example of a document suggestion system using cloud synchronization can also be provided, as follows. Suppose User 1 is looking for documents about "marketing," "presentation," and "Q1 2012." User 1 searches for these documents using an intranet search engine in his web browser, and User 1's web browser detects that these search terms are keywords. A software agent running on User 1's computer can take these keywords and save them to a keywords file in a DROPBOX™ shared folder, which causes them to be synchronized to other users who use DROPBOX™. User 2 need not even know that she has recently synchronized User 1's keywords. However, the next time she opens a document, File A, containing the words "marketing," "presentation," and/or "Q1 2012," her computer has its own software agent that has processed User 1's keywords file, and now is able to note the presence of these words in File A. User 2's software agent can save a short metadata file to DROPBOX™ that says that File A contains these three words. Since DROPBOX™ immediately synchronizes the saved file to User 1, User 1 can now immediately be notified by his own software agent that he should check out File A. Further details describing the operation of this system are disclosed below.

File metadata can include information such as modification date, creation date, ownership, access control lists, filename, and pathname. File metadata can also include statistics on who has viewed a file, when the file was viewed, when the file was edited, and who edited the file. File metadata can also include information relating to the content of a file, such as tags. For files that contain text or can be described using text keywords, tagging can be used to provide arbitrary text-based metadata for labeling a given file. All of these categories of metadata can be used to provide useful suggestions of files to users on a system. An example of providing suggestions is providing a user with a top-ten list of the most-read documents on the system that match a user's specified criteria.

In conjunction with the cloud-based data management functionality described above, file metadata can be shared across users in an organization. Using organization-wide metadata, including information about users who have accessed a document, can allow tracking of the total number of times documents are opened, even across geographical boundaries in an organization. Additionally, document suggestion using file metadata can allow documents that were previously unknown to be used in a consistent manner to communicate process, infrastructure, networks, and legal policies across an organization. As each user is only responsible for creating their own statistics files, potential file write collisions are reduced, enabling greater scalability.

This functionality can be provided as follows. Whenever a document file is accessed by the user, when the file is viewed or edited, a client software module can collect this metadata and write this metadata to a metadata file stored in the shared folder on the cloud-based database store. Additional data can also be extracted from the document and stored in the shared file. The relevant shared file in the common shared folder can be updated once the file is accessed by a user, potentially including information about the specific action performed by the user (e.g., editing, opening, viewing, sharing, etc.). A string is constructed using the username that is used to access the cloud service as input to an MD5 message-digest algorithm hash value of arbitrary size to create a globally-unique identifier (GUID) for the user ("UserGuid"). The UserGuid will be used for tracking all statistics associated with the particular user. Source filenames, including the paths, are also converted to MD5 strings unique to the particular file ("FileGuid"), which will be used for tracking all statistics associated with a particular file. The statistics file for a particular user-file pairing is stored in the common shared folder and given a filename that incorporates both the UserGuid and the FileGuid.

Figure 8:
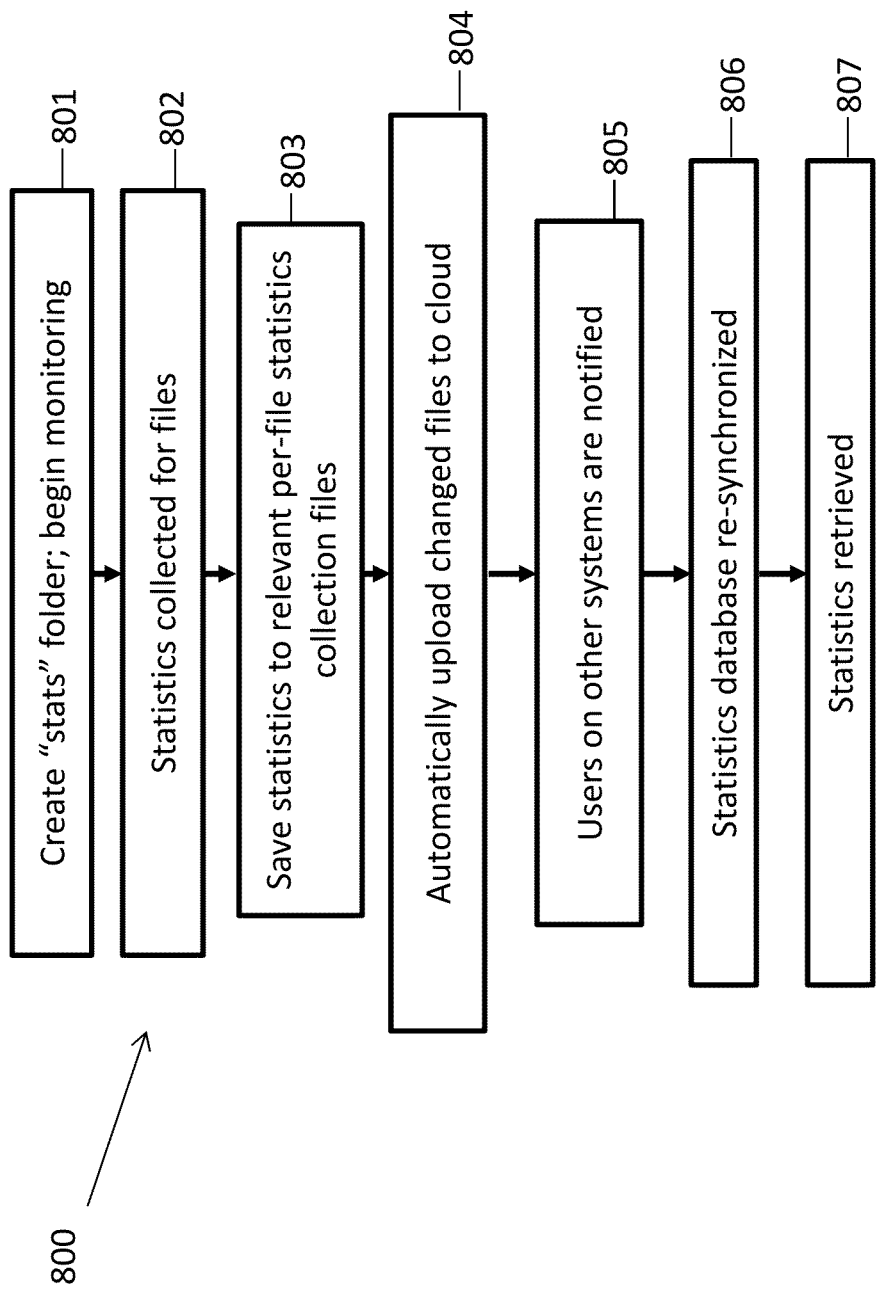
FIG. 8 is a flowchart showing exemplary document suggestion functionality in conjunction with a cloud-based database management functionality.

FIG. 8 is a flowchart indicating a process 800 including steps performed during a document suggestion procedure in conjunction with the cloud-based database management functionality described above, in accordance with some embodiments. The process 800 is exemplary only and can have stages added, removed, altered, and/or rearranged.

At step 801, a "stats" folder is set up under the .AS_METADATA folder. The folder contains one file per source file per user. The filename for each file is of the format "FileGuid-UserGuid.stat," where the FileGuid and UserGuid are MD5 hash values. Further information about the MD5 algorithm is available in RFC 1321. Other algorithms can be used to generate the hash value other than the MD5 algorithm, such as MD4 or SHA-2. The "stats" folder is subsequently monitored by the client application. At step 802, statistics are collected by client software modules, including at the time a file is opened. The collected statistics can include, for example: the full file path for the file, within the cloud storage hierarchy; the username of the user; a view count (number of times the file has been viewed, by this user); an updated count (the number of times the file has been updated, by this user); last viewed information (the last time the file was viewed, by this user); last updated information (the last time the file was updated, by this user); a top nouns tag list (a selection of the top nouns found in the document, such as a top-ten nouns list, as further disclosed in U.S. patent application Ser. No. 13/763,864, filed Feb. 11, 2013, which is hereby incorporated by reference in its entirety); and a user tag list (a list of tags found in the document, using user-driven tagging suggestions as further disclosed in U.S. patent application Ser. No. 13/457,150, filed Apr. 26, 2012, which is hereby incorporated by reference in its entirety).

At step 803, statistics are saved to the relevant stats file, one file per source file per user. At step 804, the saved file is uploaded to the cloud, which can occur automatically by operation of the underlying cloud data store. At step 805, other users can be notified that new statistics are available or they can wait until the user needs statistics. At step 806, when statistics are subsequently required to be provided, the statistics folder is synchronized with the cloud storage. This ensures that the most up-to-date information is available at suggestion time. In some embodiments, a database is constructed from the collected statistics files, which can be an in-memory database or in-memory data dictionary, for rapid access.

At step 807, statistics can be retrieved from the statistics database and provided to a client module for document suggestion and analysis. The statistics that are provided can include: top ten lists of most viewed and/or most recent documents; a list of documents that others are viewing or have viewed in the recent past; a list of other users who have opened a particular file, such as a current file that the user is editing; a list of documents that were viewed by the users who previously opened this particular file; a list of documents ranked by number of views, where this ranking can be applied to each of the lists described above; and other files that have been previously indicated by the user as files of interest, as further described below.

Figure 9:
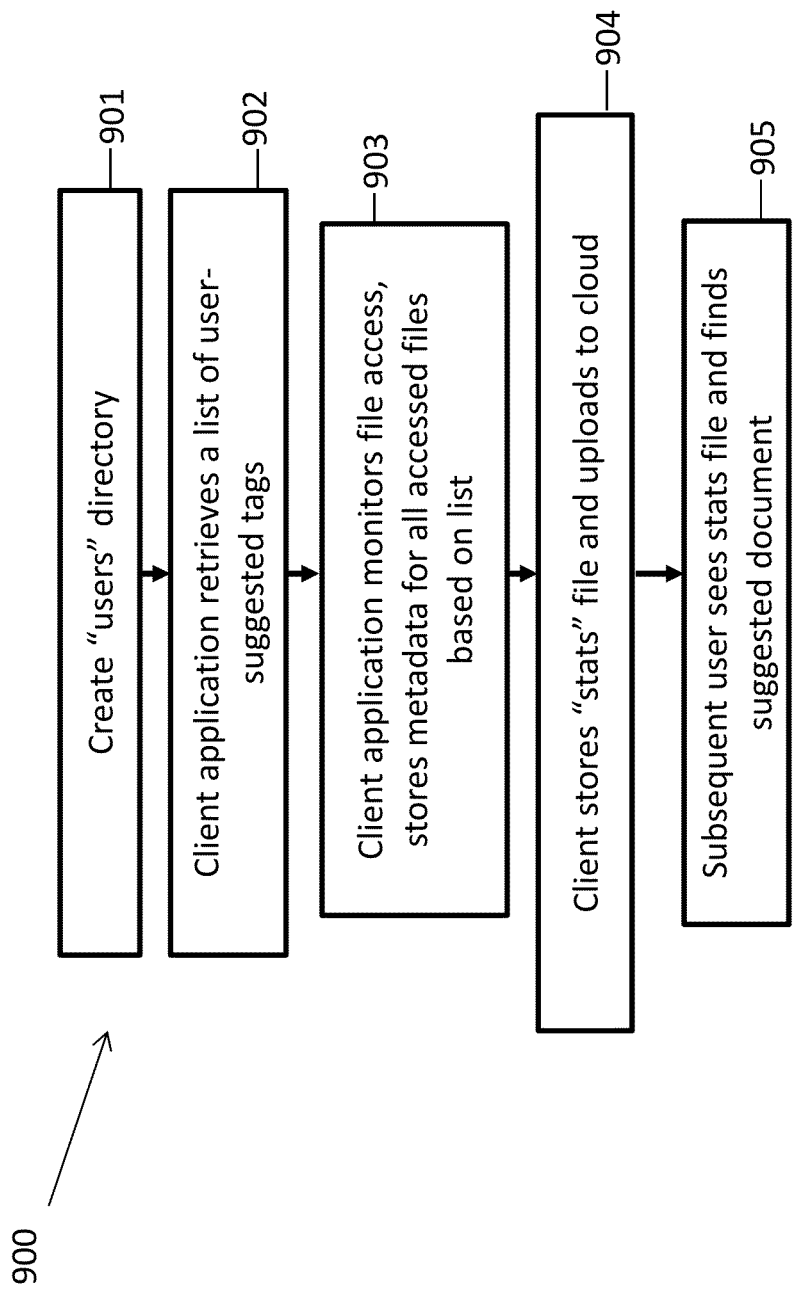
FIG. 9 is a flowchart showing further exemplary document suggestion functionality in conjunction with the cloud-based database management functionality.

FIG. 9 is a flowchart indicating a process 900 including steps performed during a further document suggestion procedure in conjunction with the cloud-based database management functionality described above, in accordance with some embodiments. The process 900 is exemplary only and can have stages added, removed, altered, and/or rearranged.

At step 901, a "users" folder within the .AS_METADATA folder is created, containing one file per user (filenames are "UserGuid.user"). Each user file contains the user's real name, an optional notify name, and a list of user-suggested tags. The notify name is a handle to be used with a notification system, such as the Apple iOS Push Notification System, wherein a user can be sent notifications at the time of occurrence of noteworthy events. The user tags are a list of words that the user is interested in, previously provided by the user; these can be managed by the user directly, by an administrator, by a web-based user interface, by a text-based user interface, or via another means.

At step 902, a client application reads all the files in the "Users" folder and retrieves a list of user-suggested tags per user. The client application is able to read user files even for users that are not the current user when the .AS_METADATA directory has been shared across a plurality of users or a whole organization, which causes the contents of the .AS_METADATA directory and its "Users" sub-directory to be synchronized to the client. The list of user-suggested tags therefore can include tags suggested by each user in an organization. The list of tags can be stored in a database, as described elsewhere herein.

At step 903, the client application monitors file access at the local device. As a file is accessed, the client application searches the accessed file for the appearance of any of the tags in the list of user-suggested tags. Any hits are stored in the user's own "stats" file for that file (e.g., "UserGuid-FileGuid.stats"). As all the user-suggested tags are used, not just the current user's tags, and as the user's stats file is accessible by all other users, the other users are consequently able to make use of the search results found by the client application on the local device, without each client having to search each document. This ensures that statistics are available for all future users.

At step 904, the modified "stats" file for the current user is uploaded to the cloud by automatic operation of the underlying cloud storage's synchronization functionality. At step 905, a subsequent user, who can be a user at a different local client device, initiates a file suggestion request, as described more fully in U.S. patent application Ser. No. 13/457,150. The client application on the local client device for the subsequent user can have access to all the files in the .AS_METADATA directory, including the statistics file uploaded by the first user. When this client application searches for files that contain a set of tags, such as the set of suggested tags for the subsequent user, the hits found in the accessed file by the previous user are incorporated into file suggestion results for the subsequent user.

Figure 10:
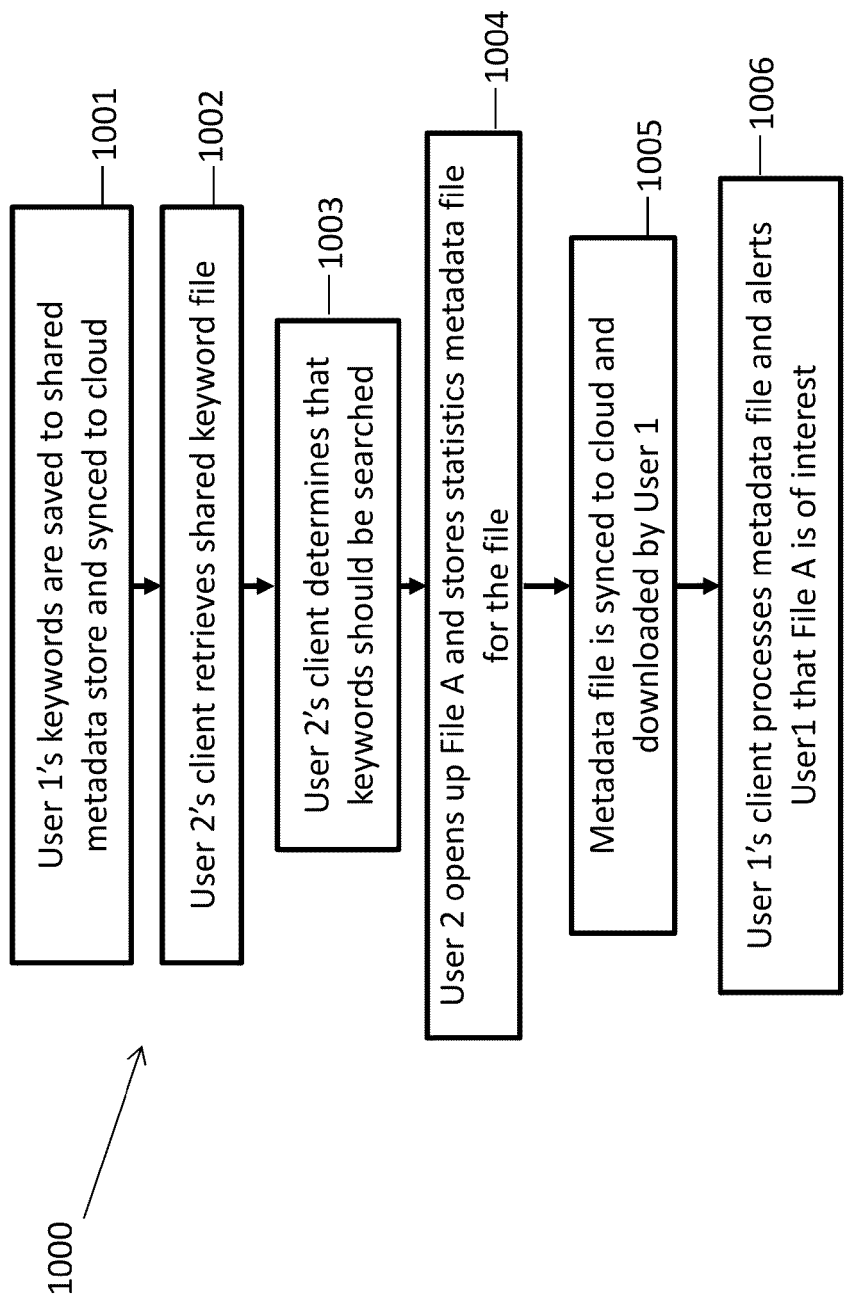
FIG. 10 is a flowchart showing exemplary multi-user document suggestion functionality in conjunction with the cloud-based database management functionality.

FIG. 10 is a flowchart showing multi-user document suggestion functionality in conjunction with the cloud-based database management functionality, in accordance with some embodiments. The following example is provided using the keywords "marketing," "presentation," and "collateral" as specific examples. User 1 is interested in a certain set of keywords, e.g., "marketing," "presentation," and "collateral."

At step 1001, User 1's client saves these keywords into a metadata file in the shared metadata store, in a designated location accessible to User 2. User 1's client automatically synchronizes the saved metadata file to the cloud.

At step 1002, User 2's client detects that a new file has been created, and also automatically synchronizes the saved metadata file from the cloud to User 2's computer. Detection that a new file has been created may be performed in conjunction with the underlyling operating system, and may include using application programming interfaces (APIs) belonging to the operating system that alert the client when a new file has been created, or may include using a background process to monitor specific files and directories to search for new files, or may include other means.

At step 1003, when User 2's client reviews the newly-downloaded metadata file, User 2's client determines that the keywords "marketing," "presentation," and "collateral" should be searched in files that are subsequently opened.

At step 1004, User 2 opens up an arbitrary file, File A. User 2 does not need to perform any additional action, but User 2's client searches File A and determines that the keywords are in this file. User 2's client identifies, or creates, a statistics metadata file for File A, and records that the keywords were found in the statistics metadata file.

At step 1005, the statistics metadata file for File A is automatically uploaded by User 2 and automatically downloaded by User 1.

At step 1006, User 1's client processes the statistics metadata file. Upon opening the statistics metadata file, User 1's client learns that User 1's keywords were found in File A. User 1's client sends a notification message or displays an alert to notify User 1 that File A can be of interest.

Figure 11:
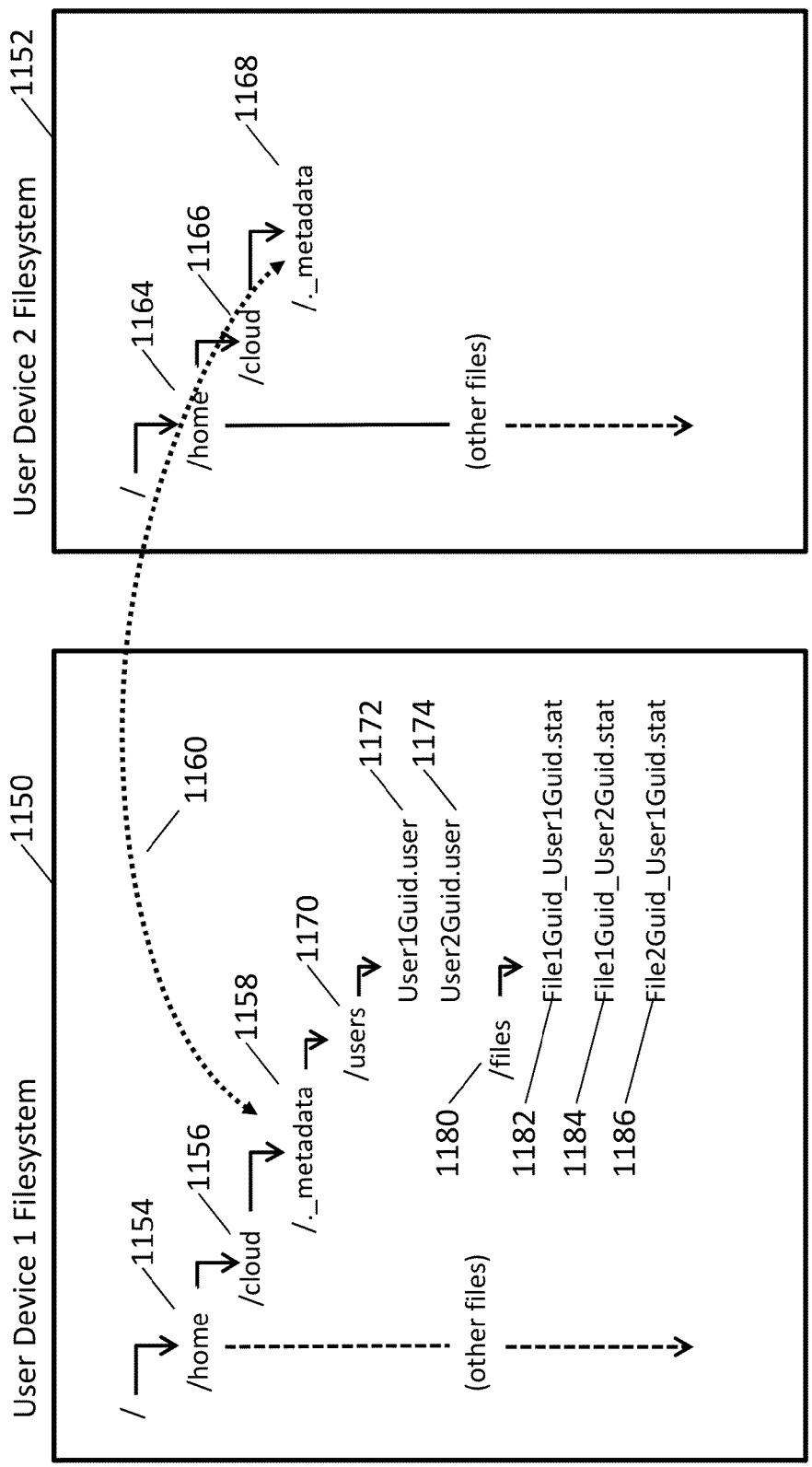
FIG. 11 is an exemplary file system layout diagram showing multiple data files.

FIG. 11 is a file system layout diagram showing multiple data files, in accordance with some embodiments. User device 1 file system can 1150 include root directory 1154, cloud directory 1156, metadata directory 1158, user directory 1170, statistics directory 1180, user statistics files 1172 and 1174, and file statistics files 1182, 1184, 1186. User device 2 file system 1152 can include root directory 1164, cloud directory 1166, and metadata directory 1168. Arrow 1160 reflects synchronization operations synchronizing metadata directories 1158 and 1168.

Root directory 1154 can reflect all files present on a user client device on user device 1 file system 1150. The user client device is capable of storing files locally, but is also capable of connecting to a cloud storage device, in some embodiments. Files selected for storing on a cloud storage system can be maintained in cloud directory 1156, such that the user device is configured to upload and synchronize files that are stored in the cloud directory with a cloud data store. A variety of files can be stored in the cloud storage system, at the discretion of the user. A metadata directory 1158 can be stored within cloud directory 1156. Metadata directory 1158 can contain data files that contain information formatted in a way that enables a database management system to import the information into a database. User directory 1170 and statistics directory 1180 can be contained within metadata directory 1158. In some embodiments, these directories can be omitted, and the files within these directories can be placed directly inside metadata directory 1150, in some cases using a filename prefix or naming convention to enable a user or system to distinguish between user and statistics metadata files.

User metadata files 1172, 1174 can be stored within user directory 1170, and pertain to information about users. Each user metadata file 1172, 1174 can be named according to a particular convention, such that the suffix ".user" appears at the end of each filename. Additionally, each filename can also contain a GUID of the user in question, indicating which user's actions are stored in that file. For example, user metadata file 1172 is given the filename "User1 Guid.user." The string "User1 Guid" can be replaced by a GUID, where the GUID is a unique data string generated by performing an MD5 hash on the username, as described elsewhere herein.

File statistics files are stored within statistics directory 1180, and pertain to information about files. Each file statistics file 1182, 1184, 1186 can be named according to a particular convention, such that the suffix ".stat" appears at the end of each filename, and additionally, each filename can also contain both a GUID of the file being described and a GUID of the user that created the file. The use of both GUIDs allows for users to be able to each provide their own metadata about a file, and for user accesses to a file to be stored in a file that is unique to a single user. Separating user statistics also allows for the cloud data store to synchronize changes among several users without fear that one user will overwrite changes made by other users, or that multiple users will attempt to write a single file, causing data loss. In some embodiments, configuration of client software can be used to permit a user to access only files that contain the user's own GUID in the filename.

Device 2 file system 1152 can reflect a file system layout which mirrors device 1 file system 1150. In some embodiments, a synchronization service synchronizes metadata directory 1158 with metadata directory 1168, such that metadata files and data files are synchronized, but other files stored within the root directory, home directory, or cloud directory are not synchronized. Synchronization can be performed between multiple devices used by the same user. If a user designates his or her metadata directory as shareable, synchronizing the metadata directory can also be performed among multiple users, which allows multi-user interaction with the data, thereby simulating a multi-user database.

Collaborative Layers

A further example of a system utilizing the above cloud database system is presented below.

Many online whiteboards exist, for example, the web service http://awwapp.com, but in general, online collaborative tools lack the ability to provide annotations on top of existing documents while storing the annotated layers separately. In such systems, an annotation is "frozen," causing the annotations to be saved to the original file, such that any annotations subsequently become difficult to extract. These systems also tend not to be optimized for sharing annotations with other users, and when annotations are saved to the original file, cause the original file to become unwieldy and difficult to share.

As well, technologies exist for collaborating on individual documents that provide comments and tracking functionality, or file sharing functionality, but these technologies are not well-suited for real-time collaboration. At the other extreme, video chat and videoconferencing technology exists for real-time collaboration, but is not well-suited for sharing lightweight annotations to files.

It is possible using the system described herein to provide annotation and collaboration at the same time, simultaneously or contemporaneously, while saving edits and annotations separate from a document, without requiring extensive setup or back-end technology resources. Editors and viewers can be allowed to choose which annotations they would like to view at a given time, and edits can be shared without requiring extensive resources using a lightweight system for storing annotations in separate files.

The present system can use the concept of layers to organize and present information. Each annotation is presented as a layer, and each layer is saved as a separate document. The layers can be given the same size of the existing document, and edits stored in the layers can be played back, viewed as an overlay (layered on top of the contents of the document), filtered, or otherwise manipulated. Individual layers are stored as separate files, and the layers are associated with their parent files.

The system can allow for multi-user collaboration and editing, without risk that a single user will overwrite, delete, corrupt, or otherwise affect another user's files or the original file. Layers can be maintained as private, or can be shared. Layers can be hidden, displayed, ordered, re-ordered, shared, copied, deleted, filtered based on attributes, such as opacity or color or date, or given specific values for attributes. Layers can be ported to another document, which can be useful especially when the underlying document is subject to change. The flexibility of the described system is therefore under the control of the user.

In some embodiments, layers can be created and stored with metadata. Metadata for each layer can include the user GUID of the creating user, the file GUID of the underlying document, the filename and/or file path, a sequence identifier consisting of a timestamp, a page number, a type, and other metadata. The timestamp can include a number of milliseconds from the start of the Unix epoch (e.g., Jan. 1, 1970). The timestamp can also take other forms. The sequence identifier can also involve other numbers and identifiers beyond a timestamp. The sequence identifier can include the file GUID and user GUID as well, such that the sequence identifier specifically and uniquely identifies a given layer, and can serve as a unique key in a database, when the layers are not stored in the cloud-based data store described above.

The page number corresponds to the page number an annotation appears on, when an annotation is applied to a multi-page document, such as a multi-page portable document format (PDF) document. The ability to identify a particular layer is also helpful when migrating a layer to another document. The type indicates a type of an annotation, e.g., text, object, and other types. In one embodiment, the types supported by the Scalable Vector Graphics (SVG) format are supported as values for this parameter.

The layer can also include further information pertaining to the actual annotation, in some embodiments, and these layers can be in an SVG format. Various fields can be used to describe the layer, including coordinates and sizes, colors, shapes, and other information. Coordinates and sizes can be stored as percentages of the page width and height, such that the annotations can be fixed to a location on the page, independent of the size of the screen or zoom factor used for displaying the document.

In some embodiments, the described layer information can be stored in a cloud-based data store such as the one described above. The user GUID and file GUID can be MD5 strings, and are substantially as described earlier in this disclosure. The source files and layer files can be stored in a shared folder in a cloud storage, to facilitate shared access. Layer files can be stored in a folder corresponding to a specific file, such that each source file can have its own layer directory. The layer directory can be named "FileGuid.layers," where "FileGuid" can be replaced with the unique global identifier for the source file. Within the layers directory, each user can have one or more files for his or her layers associated with that source file. In one embodiment, multiple layers can be stored in the same file, and the file can be named "UserGuid.layer." The use of one file per user reduces the risk that a file will be simultaneously be updated by multiple users, causing data loss. In another embodiment, one layer can be stored in each file, and a single user can have multiple layer files.

Reading all the files in the layers directory can result in the user client application becoming aware of all layers associated with a document. The client application can build a table in memory containing all layers required for annotating the source file. In some embodiments, layers can further be filtered according to various criteria. Layers can be filtered based on their creator, their owner, the time the layer was created, the time the layer was edited, based on user-defined textual tags or on a high-priority of multipurpose flag, or using any other layer metadata. Layer metadata can be stored in the layer file itself, so that a user client can read this metadata directly from the layer. Allowing users to select whose layers to view at a given time gives users the ability to focus on a specific user, such as a classroom lecturer, or such as the user's own annotations to a document. In some embodiments, users can choose whether their own annotations should be publicly shared, should be private, should not be displayed, or should be displayed. In some embodiments, users can select a set of users, and choose to view all layers that were created by the users in that set. Layers can also be filtered based on page number, so that when viewing a multi-page document, only the layers applicable for the currently-displayed page will be shown.

In some embodiments, individual layers can be deleted. The source document is not changed. Layers can be simultaneously edited by multiple users; because each layer file is owned by a single user, and because only that user can modify the layer file, the likelihood of data corruption or overwriting data is reduced using access controls. The use of cloud storage can permit real-time synchronization of layer data, in some embodiments, as well as notification of other users when updates are performed on a file. On receipt of such a notification message, a user client can synchronize the layers folder and reload the layers table from the collected user layer's files. While a particular cloud storage solution is described herein, other cloud storage solutions can also be used. In some embodiments, layers can be saved in the document; this step can be referred to as "committing" the edits or annotations to the document.

A full set of annotation tools can be provided for creation of layers and for saving as content within layers, in some embodiments. These tools can include lines, circles, shapes, arrows, boxes, text boxes, highlighting, hyperlinks, notes, comments, strikethroughs, graphics, plug-ins, and other tools.

The contents of layers can include annotation data that contains both a type of annotation (e.g., shape, text, graphic), any parameters for an annotation (e.g., the length of a line or the contents of a text label), and a location for the annotation, in some embodiments. Locations can be recorded in percentages. Percentages have the advantage that they are anchored to the page size of the underlying document, causing the attached annotations to be displayed in the same relation to the underlying document each time the annotations are displayed, regardless of screen size or zoom level. Layers can be pixel-based/bitmapped graphic data or vector graphic data, or a combination of the two.

In some embodiments, layer files can also provide access controls at a granular level, so that the layers can be accessed only by certain users. In some embodiments, these access controls will integrate with further access controls provided by a cloud server system or other system. In some embodiments, individual layers can include a privacy flag or a list of allowed users to restrict who can see a particular layer. These access controls can be processed before and/or after they are read/downloaded.

When displaying the document together with the layers, a display engine can be used. The display engine can be a scalable vector graphics (SVG) display engine, a portable document format (PDF) display engine, a PostScript display engine, a raster display engine, or another type of display engine. The display engine receives these layer parameters as input and renders the layers on top of the underlying document. In some embodiments, a two-pass method for rendering data and layers can be used. In the first pass, the document is rendered and drawn. In the second pass, the layers are drawn on top. Compositing can be performed by the engine.

The display engine can store and/or access preferences for which users' annotations to show, in some embodiments. The display engine can also show different users' annotations in different colors, and those colors can be determined at the display client, in some embodiments.

Figure 12:
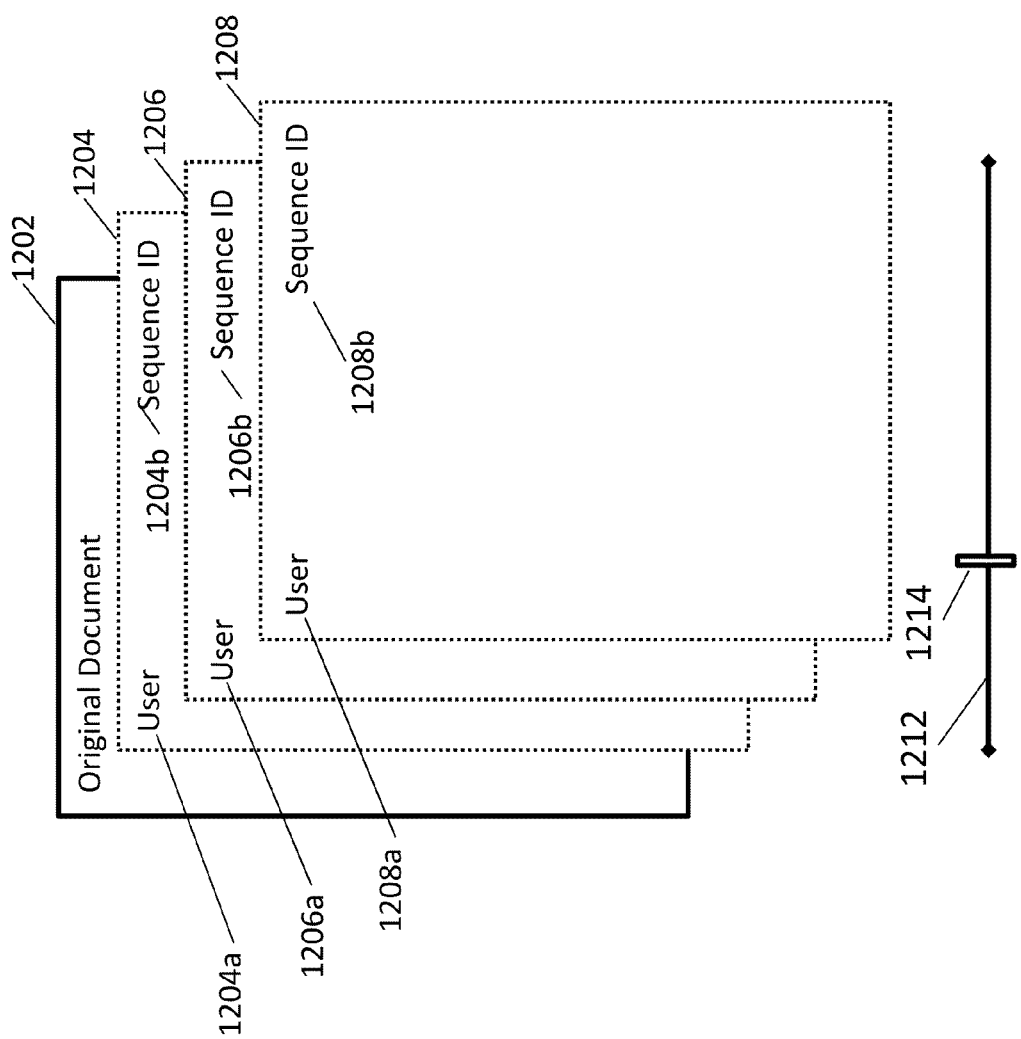
FIG. 12 is an exemplary user interface diagram of a document showing multiple layers.

FIG. 12 is an exemplary user interface diagram of a document showing multiple layers, in accordance with some embodiments. Diagram 1200 includes underlying document 1202, layer 1204, layer 1206, and layer 1208. Layer 1204 includes user label 1204a and sequence identifier 1204b. Layer 1206 also includes user label 1206a and sequence identifier 1206b. Layer 1208 also includes user label 1208a and sequence identifier 1208b. In some embodiments, each layer can be shown with its creating user and sequence identifier. The layers are stacked and shown in a three-dimensional view indicating to a viewing user that the individual layers are separate. Layers 1202, 1204, 1206, 1208 can be overlapping and/or partially or completely transparent. Layers for a particular document can be stored using the metadata management system described above. Sequence identifiers 1204*b*, 1206*b*, 1208*b* can include timestamps, such as creation timestamps, and can also include page numbers, indicating which page, if any, of a multi-page document the corresponding layer should be viewed in conjunction with.

While the layers are shown in a three-dimensional view, a two-dimensional view can also be used in some embodiments. In a two-dimensional view, all layers, some layers, or some subset of the available layers can be shown overlaid over the document. In some embodiments, only the two-dimensional layer view can be used.

Differing levels of opacity can be used; alternatively, differing levels of opacity can be used only in certain user modes, such that a composite view can be shown with all layers being shown as fully opaque. Each layer can contain only information that was added to the document, such that overlaying two layers shows the unaltered portion of the document beneath the topmost layer. A data structure can be used to track the ordering of displayed layers. This ordering can be controlled by the user, in some embodiments.

The two-dimensional layer view can use multiple colors to indicate edits on layers created by different users, one color per user. User interface controls can be provided to allow the viewing user to select or deselect individual layers and/or users. In some embodiments, a green color or designated special color can be used to hide other layers with an opaque color layer, so that the annotations on a currently-active layer can be viewed more easily.

In some embodiments, timeline 1212 can be provided as a user interface widget for manipulating layers according to time. A user can drag a control slider 1214 along timeline 1212 to display, hide, highlight, deselect, or change transparency or opacity of one or more layers, thereby viewing changes over time by user. As an example of the use of control slider 1214 and timeline 1212 to provide a time-ordered display, as the user drags slider 1214 from left to right along timeline 1212, layers 1202, 1204, 1206, 1208 can pop into view, ordered from earliest timestamp to latest timestamp. Other orders can also be used for display, such as an arbitrary order or alphabetical order of users, or another order.

As an example of a use of the described layer functionality, a shared document can be viewed in a business meeting across multiple locations, and the shared document can be annotated in real time using the system disclosed above. When a first attendee is discussing page 1 and annotating to emphasize a particular point, the annotations can be shared to everyone in real time.

Continuing the example use case, if attendee 2 is making notes on page 1, but does not want his notes shared with everyone, his or her annotations can be marked private. Attendee 3 can also be annotating page 3, ready for when the discussion reaches that page, and the annotations can be synchronized to all users by operation of the cloud-based synchronization system. Certain users can be allowed to view the original page 3 without annotations, by operation of individual user client preferences.

As a further example of a use of the described layer functionality, a lecturer can annotate pages as he or she discusses them, while allowing the entire class to see the notes. Students can annotate their own copies and choose whether others can share those notes. As with the previous example, the creator and sequence of the notes is preserved and notes can be displayed as part of a timeline of individuals or as a whole.

Figure 13:
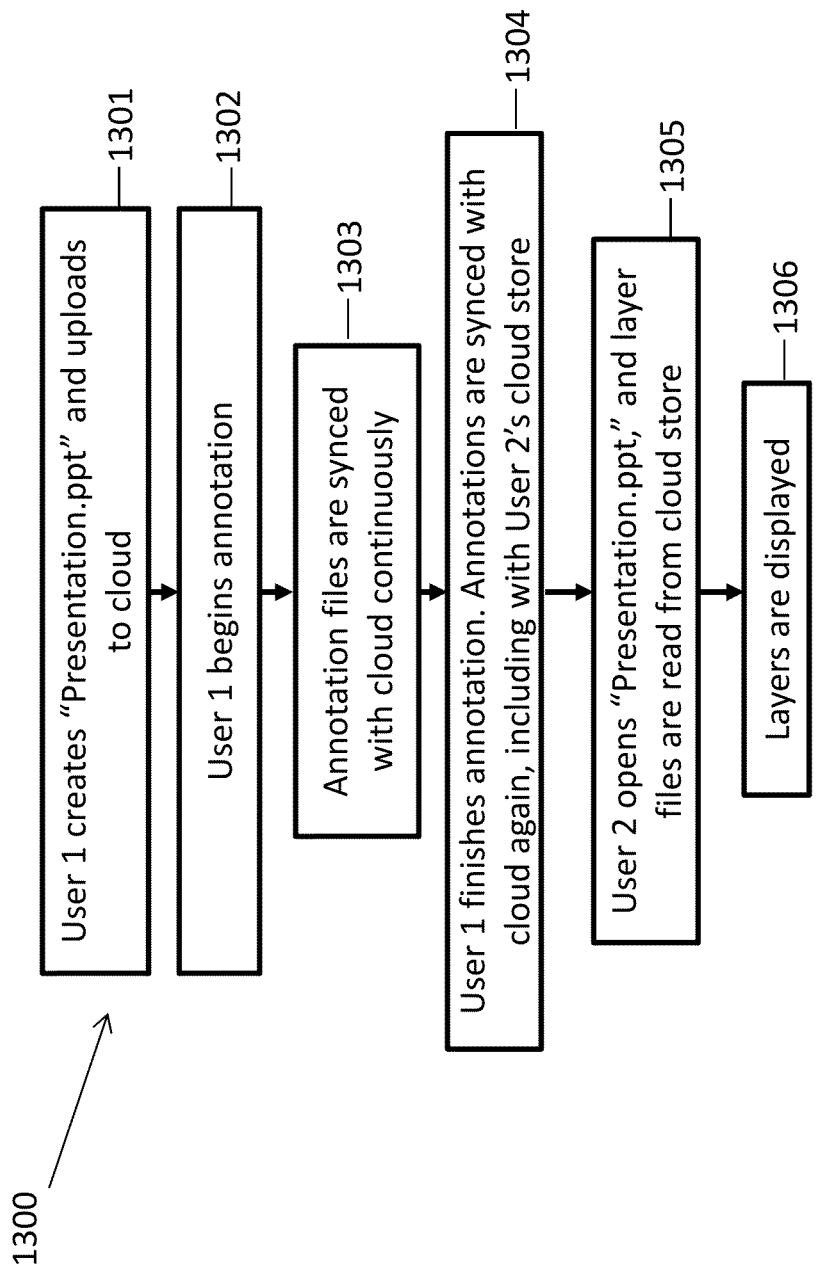
FIG. 13 is a flowchart indicating the exemplary operation of a layer display system.

FIG. 13 is a flowchart indicating a process 1300 including steps performed during operation of a layer display system, in accordance with some embodiments. The figure reflects the operation of a layer display system that utilizes the cloud data store discussed in detail above. The process 1300 is exemplary only and can have stages added, removed, altered, and/or rearranged.

At step 1301, User 1 creates a document named "Presentation.ppt," and stores it at a shared cloud location.

At step 1302, User 1 creates a first layer, for providing annotations to the document. At this time, the system creates the appropriate metadata directories in the locations described above, including a directory in the shared data area named "PresentationGuid.layers," where the string "PresentationGuid" is the FileGuid for the file "Presentation.ppt" The system also creates a layer file within this directory named "User1 Guid.layer," where "User1 Guid" is the UserGuid for User 1. This layer file is created to store all layers created by User 1.

At step 1303, the file is automatically synchronized with the cloud, and in some embodiments, the file is automatically and continuously updated as long as User 1 annotates the file, and is automatically synchronized with the cloud each time it is updated. At step 1304, User 1 completes creating the annotation, and the User1Guid.layer file is automatically saved and synchronized with the cloud.

In steps 1303 and 1304, User 2 has also been receiving synced updates from the cloud of the layer files. At step 1305, User 2 opens the document "Presentation.ppt" from its location on the shared cloud location. The user client of User 2 detects that there is a layer associated with this file by looking for the existence of the "PresentationGuid.layers" directory, and finds the directory as well as the file "User1Guid.layer." At step 1306, the user client of User 2 creates a table of layers. The user client of User 2 shows the layer to User 2, composited with the underlying document. User 2 can configure his or her display preferences according to their desired view of User 1's layer.

Various alternative embodiments are also envisioned. In some embodiments, delta transfers of files could be used to send just new data when synchronizing individual files from cloud to client. This can be optimized so that user clients add data only to the end of layer files. All layers can remain in an individual file. Deleted layers can be marked by adding another layer at the end of the file that marks an earlier layer as deleted.

In some embodiments, a File GUID can be based on the timestamp as well as the file path of the underlying document, allowing for annotations that remain associated with an old version of the document even when newer versions of the document exist.

In some embodiments, a timer can be used such that after the user has made an annotation on the document and a certain additional period of time has elapsed, the new annotation is immediately saved to a new layer without further intervention by the user. In some embodiments, this timer can be user-specified; in some embodiments, this timer can be set at a default of three seconds.

In some embodiments, a user table can be maintained by the client software. The user table can be used to allow the viewing user to identify annotating users by color. The user table can be updated by other user clients to inform a currently-viewing user that the document is currently being annotated by a particular user.

In some embodiments, users can determine whether layers they create can be viewed by others, or whether certain layers they create should be shared with only specified users. Users can control which layers are shown and hidden, and this state can be maintained separately for each user. Users can permanently delete layers that they do not wish to see; in some cases, they can be able to do this on a global level, across all users, as well as within their own specific view of a document. Users can commit or freeze documents with annotations, so that a specific set of layers with a specific set of view options can be saved to a single file, thereby enabling the user to readily share the file with others.

In some embodiments, a generalized database, and not the multi-user cloud data store described above, can be used. In the case that a generalized database is used, layers can be stored together with user GUIDs, file GUIDs, sequence identifiers and page numbers in the database.

While the above discussion describes annotation using layers, in some embodiments, the same information can be tracked for edits to a document. In particular, edits to a document can be maintained without percentage-based position information, instead using specific information about locations and objects within a document that have been edited. When displaying multiple edits on a single document, the edits can be reconciled by the client software automatically.

Other embodiments are within the scope and spirit of the invention(s).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The invention claimed is:

1. A computerized method for providing services to a client device via a shared cloud service, the method comprising:
    determining, at a second device, selection criteria for suggestion of relevant documents to a local user of the second device, including a set of keywords;
    synchronizing, to the shared cloud service, the selection criteria as a first serialized data file;
    receiving at a first device the first serialized data file, wherein the first device is a computer system that includes a memory and a processor;
    creating metadata relating to a subject on the first device in response to a remote content file on the first device being opened and the remote content file including one or more of the selection criteria from the first serialized data file, the metadata including data indicative of one or more keywords occurring in the remote content file and document metadata identifying the file;
    saving the created metadata in a second serialized format data file to the shared cloud service, the second serialized data file having a filename generated as a function of the subject and is saved separately from the subject;
    identifying the subject using a globally-unique identifier for a file, wherein the globally-unique identifier is embedded in the filename of the second serialized data file, thereby identifying the subject of the second serialized data file by the filename so that the metadata can be located in a particular location on the shared cloud service using the filename, wherein the second serialized data file is in a Javascript Object Notation data format (JSON);

providing, by identifying a globally-unique identifier for the local user (UserGuid), authenticated access to the second serialized data file for the second device via the shared cloud service, wherein the UserGuid is used for tracking all statistics regarding file accesses associated with the local user;

synchronizing a copy of the second serialized data file via the shared cloud service to the second device, the copy of the second serialized data file reflecting a single up-to-date state of the second serialized data file in the shared cloud service;

de-serializing the second serialized data file at the second device to generate a de-serialized data file;

determining, at the second device, using the metadata from the de-serialized data file, and the selection criteria that the remote content file is a relevant document, wherein the remote content file has been identified based on the metadata of the remote content file and the selection criteria determined at the second device; and suggesting, by the second device, the remote content file to the local user in response to the determined selection criteria in a table of suggestions.

2. The method of claim 1, wherein the subject comprises one of a user and a file.

3. The method of claim 1, further comprising copying the de-serialized data file into a database at the second device.

4. The method of claim 1, further comprising collecting the metadata relating to the subject at the first device.

5. The method of claim 1, further comprising sharing the second serialized data file among a plurality of users of the shared cloud service.

6. The method of claim 1, further comprising saving the second serialized data file in a metadata directory in a file hierarchy at the shared cloud service.

7. The method of claim 1, further comprising:
applying an action corresponding to the metadata at a second subject at the second device; and
synchronizing a result of the action with the first device.

8. The method of claim 7, wherein applying the action comprises searching a keyword.

9. A non-transitory computer readable medium having executable instructions operable to cause an apparatus to:
determine, at a second device, selection criteria for suggestion of relevant documents to a local user of the second device, including a set of keywords;
synchronize, to the shared cloud service, the selection criteria as a first serialized data file;
receive at a first device the first serialized data file;
create metadata relating to a subject on the first device in response to a remote content file on the first device being opened and the remote content file including one or more of the selection criteria from the first serialized data file, the metadata including data indicative of one or more keywords occurring in the remote content file and document metadata identifying the file;
save the created metadata in a second serialized format data file to the shared cloud service, the second serialized data file having a filename generated as a function of the subject and is saved separately from the subject;
identify the subject using a globally-unique identifier, wherein the globally-unique identifier is embedded in the filename of the second serialized data file, thereby identifying the subject of the second serialized data file by the filename so that the metadata can be located in a particular location on the shared cloud service using the filename, wherein the second serialized data file is in a Javascript Object Notation data format (JSON);

provide, by using a globally-unique identifier for the local user (UserGuid), authenticated access to the second serialized data file for the second device via the shared cloud service, wherein the userGuid is used for tracking all statistics regarding file accesses associated with the local user;

synchronize a copy of the second serialized data file via the shared cloud service to the second device, the copy of the second serialized data file reflecting a single up-to-date state of the second serialized data file in the shared cloud service;

de-serialize the second serialized data file at the second device to generate a de-serialized data file;

determine, at the second device, using the metadata from the de-serialized data file, and the selection criteria that the remote content file is a relevant document, wherein the remote content file has been identified based on the metadata of the remote content file and the selection criteria determined at the second device; and suggest, by the second device, the remote content file to the local user in response to the determined selection criteria in a table of suggestions.

10. The non-transitory computer readable medium of claim 9, wherein the subject comprises one of a user and a file.

11. The non-transitory computer readable medium of claim 9, wherein the executable instructions are further operable to cause the apparatus to share the second serialized data file among the plurality of users of the shared cloud service.

12. The non-transitory computer readable medium of claim 9, wherein the executable instructions are further operable to cause the apparatus to collect the metadata relating to the subject at the first device.

13. The non-transitory computer readable medium of claim 9, wherein the subject is associated with a globally-unique identifier, and wherein the executable instructions are further operable to cause the apparatus to use a Javascript Object Notation (JSON) data format for serializing the information.

14. The non-transitory computer readable medium of claim 9, wherein the executable instructions are further operable to cause the apparatus to save the second serialized data file in a metadata directory in a file hierarchy at the shared cloud service.

15. The non-transitory computer readable medium of claim 8, wherein the executable instructions are further operable to cause the apparatus to:
apply an action corresponding to the metadata at a second subject at the second device; and
synchronize a result of the action with the first device.

16. The non-transitory computer readable medium of claim 15, wherein the action is to search a keyword.

17. A networked computing system comprising:
a memory that stores a module;
a processor configured to run the module stored in the memory that is configured to cause the processor to:
determine, at a second device, selection criteria for suggestion of relevant documents to a local user of the second device, including a set of keywords;
synchronize, to the shared cloud service, the selection criteria as a first serialized data file;
receive at a first device the first serialized data file;
create metadata relating to a subject on the first device in response to a remote content file on the first device being opened and the remote content file including one or more of the selection criteria from the first serialized data file, the metadata including data indicative of one or more keywords occurring in the remote content file and document metadata identifying the file;

save the created metadata in a second serialized format data file to the shared cloud service, the second serialized data file having a filename generated as a function of the subject and is saved separately from the subject;

identify the subject using a globally-unique identifier, wherein the globally-unique identifier is embedded in the filename of the second serialized data file, thereby identifying the subject of the second serialized data file by the filename so that the metadata can be located in a particular location on the shared cloud service using the filename, wherein the second serialized data file is in a Javascript Object Notation data format (JSON);

provide, by using a globally-unique identifier for the local user (UserGuid), authenticated access to the second serialized data file for the second device via the shared cloud service, wherein the userGuid is used for tracking all statistics regarding file accesses associated with the local user;

synchronize a copy of the second serialized data file via the shared cloud service to the second device, the copy of the second serialized data file reflecting a single up-to-date state of the second serialized data file in the shared cloud service;

de-serialize the second serialized data file at the second device to generate a de-serialized data file;

determine, at the second device, using the metadata from the de-serialized data file, and the selection criteria that the remote content file is a relevant document, wherein the remote content file has been identified based on the metadata of the remote content file and the selection criteria determined at the second device; and suggest, by the second device, the remote content file to the local user in response to the determined selection criteria in a table of suggestions.

18. The networked computer system of claim 17, wherein the subject comprises one of a user and a file.

19. The networked computing system of claim 17, wherein the module is further configured to cause the processor to copy the de-serialized data file into a database at the second device.

20. The networked computing system of claim 17, wherein the module is further configured to cause the processor to collect the metadata relating to the subject at the first device.

21. The networked computing system of claim 17, wherein the module is further configured to cause the processor to share the second serialized data file among a plurality of users of the shared cloud service.

22. The networked computing system of claim 17, wherein the module is further configured to cause the processor to save the second serialized data file in a metadata directory in a file hierarchy at the shared cloud service.

23. The networked computing system of claim 17, wherein the module is further configured to cause the processor to:

apply an action corresponding to the metadata at a second subject at the second device; and synchronize a result of the action with the first device.

24. The networked computing system of claim 23, wherein the action is to search a keyword.

* * * * *